(12) United States Patent
Jerding et al.

(10) Patent No.: US 8,516,525 B1
(45) Date of Patent: Aug. 20, 2013

(54) INTEGRATED SEARCHING SYSTEM FOR INTERACTIVE MEDIA GUIDE

(76) Inventors: Dean F. Jerding, Roswell, GA (US); Arturo A. Rodriguez, Norcross, GA (US); Robert O. Banker, Cumming, GA (US)

(*) Notice: Subject to any disclaimer, the term of this patent is extended or adjusted under 35 U.S.C. 154(b) by 2655 days.

(21) Appl. No.: 09/693,790

(22) Filed: Oct. 20, 2000

Related U.S. Application Data

(63) Continuation-in-part of application No. 09/590,904, filed on Jun. 9, 2000, now Pat. No. 8,079,047.

(51) Int. Cl.
*H04N 5/445* (2011.01)

(52) U.S. Cl.
USPC .............................. 725/53; 725/52; 709/219

(58) Field of Classification Search
USPC ............................. 725/37–61; 709/217–232
See application file for complete search history.

(56) References Cited

U.S. PATENT DOCUMENTS

| | | |
|---|---|---|
| 3,676,580 A | 7/1972 | Beck |
| 4,586,158 A | 4/1986 | Brandle |
| 4,706,121 A | 11/1987 | Young |
| 4,751,578 A | 6/1988 | Reiter et al. |
| 4,821,097 A | 4/1989 | Robbins |
| 4,827,250 A | 5/1989 | Stallkamp |
| 4,885,775 A | 12/1989 | Lucas |
| 4,908,713 A | 3/1990 | Levine |
| 4,930,158 A | 5/1990 | Vogel |
| 4,949,187 A | 8/1990 | Cohen |
| 4,963,994 A | 10/1990 | Levine |
| 4,984,152 A | 1/1991 | Mueller |
| 4,991,011 A | 2/1991 | Johnson et al. |
| 5,038,211 A | 8/1991 | Hallenbeck |
| 5,172,413 A | 12/1992 | Bradley et al. |
| 5,191,410 A | 3/1993 | McCalley et al. |
| 5,253,066 A | 10/1993 | Vogel |
| 5,291,554 A | 3/1994 | Morales |
| 5,293,357 A | 3/1994 | Hallenbeck |
| 5,317,391 A | 5/1994 | Banker et al. |
| 5,329,590 A | 7/1994 | Pond |
| 5,353,121 A | 10/1994 | Young et al. |
| 5,357,276 A | 10/1994 | Banker et al. |
| 5,359,362 A | 10/1994 | Lewis et al. |
| 5,371,551 A | 12/1994 | Logan et al. |

(Continued)

FOREIGN PATENT DOCUMENTS

| | | |
|---|---|---|
| CA | 2 263 052 A1 | 11/1995 |
| CA | 2 223 025 C | 11/2001 |

(Continued)

OTHER PUBLICATIONS

"A Brief History of the Trailer," http://www.movietrailertrash.com/views/history.html, 11 pages (Publicly known at least as early as Dec. 20, 2003).

(Continued)

*Primary Examiner* — Annan Shang
(74) *Attorney, Agent, or Firm* — Merchant & Gould

(57) ABSTRACT

The invention may be viewed as a system for providing media services to a user via an interactive media services client device coupled to a programmable media services server device. A method of the preferred embodiment of the invention includes receiving user input, searching media information stored in memory, and providing the user with a search result that is related to user input.

52 Claims, 10 Drawing Sheets

(56) References Cited

U.S. PATENT DOCUMENTS

| | | | |
|---|---|---|---|
| 5,398,071 A | 3/1995 | Gove et al. | |
| 5,410,326 A | 4/1995 | Goldstein | |
| 5,410,343 A | 4/1995 | Coddington et al. | |
| 5,410,344 A | 4/1995 | Graves et al. | |
| 5,414,455 A | 5/1995 | Hooper et al. | |
| 5,418,622 A * | 5/1995 | Takeuchi | 386/96 |
| 5,448,313 A | 9/1995 | Kim et al. | |
| 5,477,262 A | 12/1995 | Banker et al. | |
| 5,479,268 A | 12/1995 | Young et al. | |
| 5,481,542 A | 1/1996 | Logston et al. | |
| 5,483,277 A | 1/1996 | Granger | |
| 5,485,216 A | 1/1996 | Lee | |
| 5,493,638 A | 2/1996 | Hooper et al. | |
| 5,508,815 A | 4/1996 | Levine | |
| 5,512,958 A | 4/1996 | Rzeszewski | |
| 5,515,495 A | 5/1996 | Ikemoto | |
| 5,521,631 A | 5/1996 | Budow et al. | |
| 5,530,754 A | 6/1996 | Garfinkle | |
| 5,532,735 A | 7/1996 | Blahut et al. | |
| 5,532,754 A | 7/1996 | Young et al. | |
| 5,544,354 A | 8/1996 | May et al. | |
| 5,555,441 A | 9/1996 | Haddad | |
| 5,557,541 A | 9/1996 | Schulhof et al. | |
| 5,562,732 A | 10/1996 | Eisenberg | |
| 5,568,272 A | 10/1996 | Levine | |
| 5,583,560 A | 12/1996 | Florin et al. | |
| 5,583,995 A | 12/1996 | Gardner et al. | |
| 5,585,821 A | 12/1996 | Ishikura et al. | |
| 5,585,838 A | 12/1996 | Lawler et al. | |
| 5,589,892 A | 12/1996 | Knee et al. | |
| 5,592,551 A | 1/1997 | Lett et al. | |
| 5,594,509 A | 1/1997 | Florin et al. | |
| 5,598,524 A | 1/1997 | Johnston, Jr. et al. | |
| 5,600,364 A | 2/1997 | Hendricks et al. | |
| 5,600,573 A | 2/1997 | Hendricks et al. | |
| 5,614,940 A | 3/1997 | Cobbley et al. | |
| 5,619,247 A | 4/1997 | Russo | |
| 5,619,249 A | 4/1997 | Billock et al. | |
| 5,621,456 A | 4/1997 | Florin et al. | |
| 5,623,613 A | 4/1997 | Rowe et al. | |
| 5,625,405 A | 4/1997 | DuLac et al. | |
| 5,625,864 A | 4/1997 | Budow et al. | |
| 5,629,732 A | 5/1997 | Moskowitz et al. | |
| 5,631,693 A | 5/1997 | Wunderlich et al. | |
| 5,632,681 A | 5/1997 | Bakoglu et al. | |
| 5,635,979 A | 6/1997 | Kostreski et al. | |
| 5,635,980 A | 6/1997 | Lin et al. | |
| 5,635,989 A | 6/1997 | Rothmuller | |
| 5,650,831 A | 7/1997 | Farwell | |
| 5,659,350 A | 8/1997 | Hendricks et al. | |
| 5,664,133 A | 9/1997 | Malamud | |
| 5,666,293 A | 9/1997 | Metz et al. | |
| 5,671,411 A | 9/1997 | Watts et al. | |
| 5,675,752 A | 10/1997 | Scott et al. | |
| 5,682,206 A | 10/1997 | Wehmeyer et al. | |
| 5,682,597 A | 10/1997 | Ganek et al. | |
| 5,684,918 A | 11/1997 | Abecassis | |
| 5,686,954 A | 11/1997 | Yoshinobu et al. | |
| 5,687,331 A | 11/1997 | Volk et al. | |
| 5,689,641 A | 11/1997 | Ludwig et al. | |
| 5,694,176 A | 12/1997 | Bruette et al. | |
| 5,694,546 A | 12/1997 | Reisman | |
| 5,699,107 A | 12/1997 | Lawler et al. | |
| 5,715,169 A | 2/1998 | Noguchi | |
| 5,715,515 A | 2/1998 | Akins, III et al. | |
| 5,721,827 A | 2/1998 | Logan et al. | |
| 5,721,829 A | 2/1998 | Dunn et al. | |
| 5,721,897 A | 2/1998 | Rubinstein | |
| 5,724,106 A | 3/1998 | Autry et al. | |
| 5,724,521 A | 3/1998 | Dedrick | |
| 5,724,646 A | 3/1998 | Ganek et al. | |
| 5,727,060 A * | 3/1998 | Young | 348/734 |
| 5,729,549 A | 3/1998 | Kostreski et al. | |
| 5,732,216 A | 3/1998 | Logan et al. | |
| 5,734,853 A | 3/1998 | Hendricks et al. | |
| 5,737,028 A | 4/1998 | Bertram et al. | |
| 5,740,304 A | 4/1998 | Katsuyama et al. | |
| 5,740,549 A | 4/1998 | Reilly et al. | |
| 5,745,837 A | 4/1998 | Fuhrmann | |
| 5,748,493 A | 5/1998 | Lightfoot et al. | |
| 5,751,282 A | 5/1998 | Girard et al. | |
| 5,752,160 A | 5/1998 | Dunn | |
| 5,754,773 A | 5/1998 | Ozden et al. | |
| 5,764,873 A | 6/1998 | Magid et al. | |
| 5,764,899 A | 6/1998 | Eggleston et al. | |
| 5,771,435 A | 6/1998 | Brown | |
| 5,774,170 A | 6/1998 | Hite et al. | |
| 5,778,077 A | 7/1998 | Davidson | |
| 5,790,170 A | 8/1998 | Suzuki | |
| 5,790,176 A | 8/1998 | Craig | |
| 5,790,935 A | 8/1998 | Payton | |
| 5,790,940 A | 8/1998 | Laborde et al. | |
| 5,796,828 A | 8/1998 | Tsukamoto et al. | |
| 5,798,785 A | 8/1998 | Hendricks et al. | |
| 5,799,063 A | 8/1998 | Krane | |
| 5,801,747 A | 9/1998 | Bedard | |
| 5,801,787 A | 9/1998 | Schein et al. | |
| 5,802,502 A | 9/1998 | Gell et al. | |
| 5,808,608 A | 9/1998 | Young et al. | |
| 5,808,611 A | 9/1998 | Johnson et al. | |
| 5,809,204 A | 9/1998 | Young et al. | |
| 5,812,123 A | 9/1998 | Rowe et al. | |
| 5,812,124 A | 9/1998 | Eick et al. | |
| 5,812,786 A | 9/1998 | Seazholtz et al. | |
| 5,822,123 A | 10/1998 | Davis et al. | |
| 5,826,110 A | 10/1998 | Ozden et al. | |
| 5,828,419 A | 10/1998 | Bruette et al. | |
| 5,828,845 A | 10/1998 | Jagadish et al. | |
| 5,835,843 A | 11/1998 | Haddad | |
| 5,838,314 A | 11/1998 | Neel et al. | |
| 5,844,620 A | 12/1998 | Coleman et al. | |
| 5,848,352 A | 12/1998 | Dougherty et al. | |
| 5,850,218 A | 12/1998 | LaJoie et al. | |
| 5,856,975 A | 1/1999 | Rostoker et al. | |
| 5,859,641 A | 1/1999 | Cave | |
| 5,861,906 A | 1/1999 | Dunn et al. | |
| 5,877,756 A | 3/1999 | Um | |
| 5,880,768 A | 3/1999 | Lemmons et al. | |
| 5,886,690 A | 3/1999 | Pond et al. | |
| 5,886,732 A * | 3/1999 | Humpleman | 725/49 |
| 5,895,454 A | 4/1999 | Harrington | |
| 5,898,456 A | 4/1999 | Wahl | |
| 5,900,905 A | 5/1999 | Shoff et al. | |
| 5,905,522 A | 5/1999 | Lawler | |
| 5,905,942 A | 5/1999 | Stoel et al. | |
| 5,907,323 A | 5/1999 | Lawler et al. | |
| 5,913,040 A | 6/1999 | Rakavy et al. | |
| 5,914,712 A | 6/1999 | Sartain et al. | |
| 5,914,746 A | 6/1999 | Matthews, III et al. | |
| 5,915,068 A | 6/1999 | Levine | |
| 5,917,822 A | 6/1999 | Lyles et al. | |
| 5,929,849 A | 7/1999 | Kikinis | |
| 5,930,493 A * | 7/1999 | Ottesen et al. | 725/92 |
| 5,935,206 A | 8/1999 | Dixon et al. | |
| 5,936,659 A | 8/1999 | Viswanathan | |
| 5,940,073 A | 8/1999 | Klosterman et al. | |
| 5,943,047 A | 8/1999 | Suzuki | |
| 5,956,024 A | 9/1999 | Strickland et al. | |
| 5,956,716 A | 9/1999 | Kenner et al. | |
| 5,960,411 A | 9/1999 | Hartman et al. | |
| 5,961,603 A | 10/1999 | Kunkel et al. | |
| 5,969,748 A | 10/1999 | Casement et al. | |
| 5,978,043 A | 11/1999 | Blonstein et al. | |
| 5,983,273 A | 11/1999 | White et al. | |
| 5,986,650 A | 11/1999 | Ellis et al. | |
| 5,987,256 A | 11/1999 | Wu et al. | |
| 5,990,881 A | 11/1999 | Inoue et al. | |
| 5,990,890 A | 11/1999 | Etheredge | |
| 5,990,927 A | 11/1999 | Hendricks et al. | |
| 5,995,134 A | 11/1999 | Hayashi | |
| 6,002,401 A | 12/1999 | Baker | |
| 6,005,565 A * | 12/1999 | Legall et al. | 715/721 |
| 6,005,631 A | 12/1999 | Anderson et al. | |
| 6,006,257 A | 12/1999 | Slezak | |

| | | | | | | | |
|---|---|---|---|---|---|---|---|
| 6,008,803 | A | 12/1999 | Rowe et al. | 6,292,624 | B1 | 9/2001 | Saib et al. |
| 6,008,836 | A | 12/1999 | Bruck et al. | 6,305,019 | B1 | 10/2001 | Dyer et al. |
| 6,014,184 | A | 1/2000 | Knee et al. | 6,311,011 | B1 | 10/2001 | Kuroda |
| 6,014,694 | A | 1/2000 | Aharoni et al. | 6,314,572 | B1 | 11/2001 | LaRocca et al. |
| 6,016,348 | A | 1/2000 | Blatter et al. | 6,314,573 | B1 | 11/2001 | Gordon et al. |
| 6,018,359 | A | 1/2000 | Kermode | 6,314,575 | B1 | 11/2001 | Billock et al. |
| 6,018,372 | A | 1/2000 | Etheredge | 6,317,777 | B1 | 11/2001 | Skarbo et al. |
| 6,020,912 | A | 2/2000 | De Lang | 6,317,885 | B1 | 11/2001 | Fries |
| 6,023,267 | A | 2/2000 | Chapuis et al. | 6,323,911 | B1 | 11/2001 | Schein et al. |
| 6,025,837 | A | 2/2000 | Matthews, III et al. | 6,327,628 | B1 | 12/2001 | Anuff et al. |
| 6,025,868 | A | 2/2000 | Russo | 6,335,936 | B1 | 1/2002 | Bossemeyer, Jr. et al. |
| 6,025,869 | A | 2/2000 | Stas et al. | 6,347,400 | B1 | 2/2002 | Ohkura et al. |
| 6,026,376 | A | 2/2000 | Kenney | 6,349,410 | B1 | 2/2002 | Lortz |
| 6,035,281 | A | 3/2000 | Crosskey et al. | 6,353,448 | B1 | 3/2002 | Scarborough et al. |
| 6,037,933 | A | 3/2000 | Blonstein et al. | 6,357,046 | B1 | 3/2002 | Thompson et al. |
| 6,049,831 | A | 4/2000 | Gardell et al. | 6,359,636 | B1 | 3/2002 | Schindler et al. |
| 6,057,872 | A | 5/2000 | Candelore | 6,360,367 | B1 | 3/2002 | Yamamoto |
| 6,061,097 | A | 5/2000 | Satterfield | 6,362,841 | B1 | 3/2002 | Nykanen |
| 6,064,380 | A | 5/2000 | Swenson et al. | 6,367,078 | B1 | 4/2002 | Lasky |
| 6,064,980 | A | 5/2000 | Jacobi et al. | 6,378,130 | B1 | 4/2002 | Adams |
| 6,070,186 | A | 5/2000 | Nishio | 6,381,332 | B1 | 4/2002 | Glaab |
| 6,072,982 | A | 6/2000 | Haddad | 6,385,614 | B1 | 5/2002 | Vellandi |
| 6,073,105 | A | 6/2000 | Sutcliffe et al. | 6,393,585 | B1 | 5/2002 | Houha et al. |
| 6,075,575 | A | 6/2000 | Schein et al. | 6,396,549 | B1 | 5/2002 | Weber |
| 6,081,263 | A | 6/2000 | LeGall et al. | 6,400,280 | B1 | 6/2002 | Osakabe |
| 6,085,185 | A | 7/2000 | Matsuzawa et al. | 6,401,243 | B1 | 6/2002 | Suzuki |
| 6,094,680 | A | 7/2000 | Hokanson | 6,405,239 | B1 | 6/2002 | Addington et al. |
| 6,097,383 | A | 8/2000 | Gaughan et al. | 6,421,067 | B1 | 7/2002 | Kamen et al. |
| 6,098,082 | A | 8/2000 | Gibbon et al. | 6,429,899 | B1 | 8/2002 | Nio et al. |
| 6,101,512 | A | 8/2000 | DeRose et al. | 6,434,748 | B1 | 8/2002 | Shen et al. |
| 6,108,002 | A | 8/2000 | Ishizaki | 6,441,862 | B1 | 8/2002 | Yuen et al. |
| 6,108,042 | A | 8/2000 | Adams et al. | 6,442,332 | B1 * | 8/2002 | Knudson et al. ............... 386/291 |
| 6,118,445 | A | 9/2000 | Nonomura et al. | 6,442,755 | B1 | 8/2002 | Lemmons et al. |
| 6,118,976 | A | 9/2000 | Arias et al. | 6,442,756 | B1 | 8/2002 | Durden et al. |
| 6,124,878 | A | 9/2000 | Adams et al. | 6,446,261 | B1 | 9/2002 | Rosser |
| 6,125,259 | A | 9/2000 | Perlman | 6,446,262 | B1 | 9/2002 | Malaure et al. |
| 6,133,909 | A * | 10/2000 | Schein et al. ............... 345/721 | 6,460,181 | B1 | 10/2002 | Donnelly |
| 6,137,539 | A * | 10/2000 | Lownes et al. ............... 348/569 | 6,463,585 | B1 | 10/2002 | Hendricks et al. |
| 6,138,139 | A | 10/2000 | Beck et al. | 6,476,833 | B1 | 11/2002 | Moshfeghi |
| 6,141,003 | A | 10/2000 | Chor et al. | 6,480,669 | B1 | 11/2002 | Tsumagari et al. |
| 6,141,488 | A | 10/2000 | Knudson et al. | 6,481,010 | B2 * | 11/2002 | Nishikawa et al. ............ 725/44 |
| 6,145,083 | A | 11/2000 | Shaffer et al. | 6,481,011 | B1 | 11/2002 | Lemmons |
| 6,148,332 | A | 11/2000 | Brewer et al. | 6,486,920 | B2 | 11/2002 | Arai et al. |
| 6,151,059 | A | 11/2000 | Schein et al. | 6,501,902 | B1 | 12/2002 | Wang |
| 6,157,377 | A | 12/2000 | Shah-Nazaroff et al. | 6,505,348 | B1 | 1/2003 | Knowles et al. |
| 6,157,413 | A | 12/2000 | Hanafee et al. | 6,507,949 | B1 | 1/2003 | Jonason et al. |
| 6,160,546 | A | 12/2000 | Thompson et al. | 6,510,556 | B1 | 1/2003 | Kusaba et al. |
| 6,160,989 | A | 12/2000 | Hendricks et al. | 6,515,680 | B1 * | 2/2003 | Hendricks et al. ............ 345/716 |
| 6,163,272 | A | 12/2000 | Goode et al. | 6,515,710 | B1 * | 2/2003 | Koshimuta ..................... 348/557 |
| 6,166,730 | A | 12/2000 | Goode et al. | 6,519,770 | B2 | 2/2003 | Ford |
| 6,169,543 | B1 | 1/2001 | Wehmeyer | 6,526,575 | B1 | 2/2003 | McCoy et al. |
| 6,172,674 | B1 | 1/2001 | Etheredge | 6,526,577 | B1 | 2/2003 | Knudson et al. |
| 6,172,677 | B1 | 1/2001 | Stautner et al. | 6,532,589 | B1 | 3/2003 | Proehl et al. |
| 6,177,931 | B1 * | 1/2001 | Alexander et al. ............ 725/52 | 6,536,041 | B1 | 3/2003 | Knudson et al. |
| 6,181,333 | B1 | 1/2001 | Chaney et al. | 6,539,548 | B1 | 3/2003 | Hendricks et al. |
| 6,181,693 | B1 | 1/2001 | Maresca | 6,543,053 | B1 | 4/2003 | Li et al. |
| 6,182,287 | B1 | 1/2001 | Schneidewend et al. | 6,545,669 | B1 | 4/2003 | Kinawi et al. |
| 6,184,877 | B1 * | 2/2001 | Dodson et al. ............... 725/110 | 6,557,030 | B1 | 4/2003 | Hoang |
| 6,188,684 | B1 | 2/2001 | Setoyama et al. | 6,563,515 | B1 * | 5/2003 | Reynolds et al. ............ 715/721 |
| 6,195,689 | B1 | 2/2001 | Bahlmann | 6,564,378 | B1 | 5/2003 | Satterfield et al. |
| 6,201,540 | B1 | 3/2001 | Gallup et al. | 6,564,379 | B1 * | 5/2003 | Knudson et al. ............... 725/42 |
| 6,205,485 | B1 | 3/2001 | Kikinis | 6,564,383 | B1 * | 5/2003 | Combs et al. ................. 725/136 |
| 6,208,335 | B1 | 3/2001 | Gordon et al. | 6,571,390 | B1 | 5/2003 | Dunn et al. |
| 6,209,130 | B1 | 3/2001 | Rector et al. | 6,574,793 | B1 | 6/2003 | Ngo et al. |
| 6,216,264 | B1 | 4/2001 | Maze et al. | 6,578,077 | B1 | 6/2003 | Rakoshitz et al. |
| 6,238,290 | B1 | 5/2001 | Tarr et al. | 6,594,699 | B1 * | 7/2003 | Sahai et al. ..................... 709/228 |
| 6,239,845 | B1 | 5/2001 | Itagaki et al. | 6,594,825 | B1 * | 7/2003 | Goldschmidt Iki et al. .... 725/53 |
| 6,240,555 | B1 | 5/2001 | Shoff et al. | 6,600,496 | B1 | 7/2003 | Wagner et al. |
| 6,243,142 | B1 | 6/2001 | Mugura et al. | 6,604,240 | B2 | 8/2003 | Ellis et al. |
| 6,249,532 | B1 | 6/2001 | Yoshikawa et al. | 6,609,253 | B1 | 8/2003 | Swix et al. |
| 6,253,375 | B1 | 6/2001 | Gordon et al. | 6,611,958 | B1 | 8/2003 | Shintani et al. |
| 6,259,733 | B1 | 7/2001 | Kaye et al. | 6,614,440 | B1 | 9/2003 | Bowen et al. |
| 6,266,814 | B1 | 7/2001 | Lemmons et al. | 6,614,988 | B1 | 9/2003 | Sampsell |
| 6,268,849 | B1 * | 7/2001 | Boyer et al. ..................... 725/40 | 6,628,302 | B2 | 9/2003 | White et al. |
| 6,272,484 | B1 | 8/2001 | Martin et al. | 6,631,413 | B1 | 10/2003 | Aggarwal et al. |
| 6,275,268 | B1 | 8/2001 | Ellis et al. | 6,642,939 | B1 | 11/2003 | Vallone et al. |
| 6,282,713 | B1 | 8/2001 | Kitsukawa et al. | 6,647,548 | B1 | 11/2003 | Lu et al. |
| 6,289,346 | B1 | 9/2001 | Milewski et al. | 6,651,044 | B1 | 11/2003 | Stoneman |
| 6,289,514 | B1 | 9/2001 | Link et al. | 6,662,365 | B1 | 12/2003 | Sullivan et al. |

| | | |
|---|---|---|
| 6,665,869 B1 | 12/2003 | Ellis et al. |
| 6,671,328 B1 | 12/2003 | Poon et al. |
| 6,675,384 B1 | 1/2004 | Block et al. |
| 6,675,385 B1 | 1/2004 | Wang |
| 6,678,891 B1 | 1/2004 | Wilcox et al. |
| 6,681,395 B1 | 1/2004 | Nishi |
| 6,681,396 B1 | 1/2004 | Bates et al. |
| 6,684,025 B1 | 1/2004 | Perlman |
| 6,684,400 B1 | 1/2004 | Goode et al. |
| 6,690,391 B1 | 2/2004 | Proehl et al. |
| 6,697,376 B1 | 2/2004 | Son et al. |
| 6,698,023 B2 | 2/2004 | Levitan |
| 6,701,523 B1 | 3/2004 | Hancock et al. |
| 6,701,528 B1 | 3/2004 | Arsenault et al. |
| 6,708,311 B1 * | 3/2004 | Berstis .................. 715/533 |
| 6,708,336 B1 | 3/2004 | Bruette |
| 6,717,590 B1 | 4/2004 | Sullivan et al. |
| 6,718,552 B1 | 4/2004 | Goode |
| 6,725,461 B1 | 4/2004 | Dougherty et al. |
| 6,731,310 B2 | 5/2004 | Craycroft et al. |
| 6,732,367 B2 | 5/2004 | Ellis et al. |
| 6,732,369 B1 | 5/2004 | Schein et al. |
| 6,732,372 B2 | 5/2004 | Tomita et al. |
| 6,735,572 B2 | 5/2004 | Landesmann |
| 6,738,982 B1 | 5/2004 | Jerding |
| 6,757,909 B1 | 6/2004 | Maruo et al. |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,209 B1 | 8/2004 | Chernock et al. |
| 6,772,433 B1 | 8/2004 | LaJoie et al. |
| 6,782,550 B1 | 8/2004 | Cao |
| 6,791,620 B1 | 9/2004 | Elswick et al. |
| 6,792,615 B1 | 9/2004 | Rowe et al. |
| 6,801,533 B1 | 10/2004 | Barkley |
| 6,817,028 B1 | 11/2004 | Jerding et al. |
| 6,832,386 B1 | 12/2004 | Jerding et al. |
| 6,847,969 B1 | 1/2005 | Mathai et al. |
| 6,876,628 B2 | 4/2005 | Howard et al. |
| 6,898,762 B2 | 5/2005 | Ellis et al. |
| 6,901,385 B2 | 5/2005 | Okamoto et al. |
| 6,957,386 B2 * | 10/2005 | Nishina et al. ............... 715/716 |
| 6,968,372 B1 | 11/2005 | Thompson et al. |
| 6,978,310 B1 | 12/2005 | Rodriguez et al. |
| 6,978,475 B1 | 12/2005 | Kunin et al. |
| 6,986,156 B1 | 1/2006 | Rodriguez et al. |
| 6,990,676 B1 | 1/2006 | Proehl et al. |
| 6,990,677 B1 | 1/2006 | Pietraszak et al. |
| 6,993,782 B1 | 1/2006 | Newberry et al. |
| 7,010,801 B1 | 3/2006 | Jerding et al. |
| 7,024,681 B1 | 4/2006 | Fransman et al. |
| 7,039,944 B1 | 5/2006 | Cho et al. |
| 7,062,466 B2 | 6/2006 | Wagner et al. |
| 7,076,734 B2 | 7/2006 | Wolff et al. |
| 7,086,077 B2 | 8/2006 | Giammaressi |
| 7,103,903 B1 | 9/2006 | Kydd |
| 7,110,714 B1 | 9/2006 | Kay et al. |
| 7,117,440 B2 | 10/2006 | Gordon et al. |
| 7,120,926 B1 | 10/2006 | Safadi et al. |
| 7,143,430 B1 | 11/2006 | Fingerman et al. |
| 7,150,031 B1 | 12/2006 | Rodriguez et al. |
| 7,155,733 B2 | 12/2006 | Rodriguez et al. |
| 7,180,422 B2 | 2/2007 | Milenkovic et al. |
| 7,185,355 B1 | 2/2007 | Ellis et al. |
| 7,188,356 B1 | 3/2007 | Miura et al. |
| 7,194,757 B1 | 3/2007 | Fish et al. |
| 7,200,857 B1 | 4/2007 | Rodriguez et al. |
| 7,237,251 B1 | 6/2007 | Oz et al. |
| 7,243,364 B2 | 7/2007 | Dunn et al. |
| 7,249,366 B1 | 7/2007 | Flavin |
| 7,324,552 B1 | 1/2008 | Galand et al. |
| 7,324,553 B1 | 1/2008 | Varier et al. |
| 7,334,251 B2 | 2/2008 | Rodriguez et al. |
| 7,340,759 B1 | 3/2008 | Rodriguez |
| 7,343,614 B1 | 3/2008 | Hendricks et al. |
| 7,356,477 B1 | 4/2008 | Allan et al. |
| 7,404,200 B1 | 7/2008 | Hailey et al. |
| 7,496,943 B1 | 2/2009 | Goldberg et al. |
| 7,496,945 B2 | 2/2009 | Rodriguez |
| 7,509,267 B1 | 3/2009 | Yarmolich et al. |
| 7,512,964 B2 | 3/2009 | Rodriguez et al. |
| 7,526,788 B2 | 4/2009 | Rodriguez |
| 7,647,549 B2 | 1/2010 | Denoual et al. |
| 7,673,314 B2 | 3/2010 | Ellis et al. |
| 7,685,520 B2 | 3/2010 | Rashkovskiy et al. |
| 7,707,614 B2 | 4/2010 | Krikorian et al. |
| 7,925,534 B2 | 4/2011 | Amano et al. |
| 7,934,232 B1 | 4/2011 | Jerding et al. |
| 7,961,643 B2 | 6/2011 | McDonald et al. |
| 7,962,370 B2 | 6/2011 | Rodriguez et al. |
| 7,975,277 B1 | 7/2011 | Jerding et al. |
| 7,992,163 B1 | 8/2011 | Jerding et al. |
| 7,992,166 B2 | 8/2011 | Jerding et al. |
| 8,005,713 B1 | 8/2011 | Sanz-Pastor et al. |
| 8,006,262 B2 | 8/2011 | Rodriguez et al. |
| 8,006,273 B2 | 8/2011 | Rodriguez |
| 8,020,184 B2 | 9/2011 | Jerding et al. |
| 8,032,914 B2 | 10/2011 | Rodriguez |
| 8,037,504 B2 | 10/2011 | Jerding et al. |
| 8,056,106 B2 | 11/2011 | Rodriguez et al. |
| 8,069,259 B2 | 11/2011 | Rodriguez et al. |
| 8,079,047 B1 | 12/2011 | Jerding et al. |
| 8,161,388 B2 | 4/2012 | Rodriguez et al. |
| 8,189,472 B2 | 5/2012 | McDonald et al. |
| 8,191,093 B2 | 5/2012 | Rodriguez |
| 8,255,951 B2 | 8/2012 | Jerding et al. |
| 2001/0003846 A1 | 6/2001 | Rowe et al. |
| 2001/0013125 A1 | 8/2001 | Kitsukawa et al. |
| 2001/0013127 A1 | 8/2001 | Tomita et al. |
| 2001/0029523 A1 | 10/2001 | Mcternan et al. |
| 2001/0030667 A1 | 10/2001 | Kelts |
| 2001/0032335 A1 | 10/2001 | Jones |
| 2001/0034763 A1 | 10/2001 | Jacobs et al. |
| 2001/0036271 A1 | 11/2001 | Javed |
| 2001/0044744 A1 | 11/2001 | Rhoads |
| 2002/0002642 A1 | 1/2002 | Tyson et al. |
| 2002/0007485 A1 | 1/2002 | Rodriguez et al. |
| 2002/0013836 A1 | 1/2002 | Friedman et al. |
| 2002/0026496 A1 | 2/2002 | Boyer et al. |
| 2002/0026638 A1 | 2/2002 | Eldering et al. |
| 2002/0032638 A1 | 3/2002 | Arora et al. |
| 2002/0032728 A1 | 3/2002 | Sako et al. |
| 2002/0032905 A1 | 3/2002 | Sherr et al. |
| 2002/0042913 A1 | 4/2002 | Ellis et al. |
| 2002/0044762 A1 | 4/2002 | Wood et al. |
| 2002/0049804 A1 | 4/2002 | Rodriguez et al. |
| 2002/0049978 A1 | 4/2002 | Rodriguez et al. |
| 2002/0056098 A1 | 5/2002 | White |
| 2002/0056118 A1 | 5/2002 | Hunter et al. |
| 2002/0057336 A1 | 5/2002 | Gaul et al. |
| 2002/0062481 A1 | 5/2002 | Slaney et al. |
| 2002/0069105 A1 | 6/2002 | do Rosario Botelho |
| 2002/0069218 A1 | 6/2002 | Sull et al. |
| 2002/0069412 A1 | 6/2002 | Philips |
| 2002/0078176 A1 | 6/2002 | Nomura et al. |
| 2002/0083443 A1 | 6/2002 | Eldering et al. |
| 2002/0087981 A1 | 7/2002 | Daniels |
| 2002/0101367 A1 | 8/2002 | Geiger et al. |
| 2002/0104083 A1 | 8/2002 | Hendricks et al. |
| 2002/0108125 A1 | 8/2002 | Joao |
| 2002/0124249 A1 | 9/2002 | Shintani et al. |
| 2002/0128908 A1 | 9/2002 | Levin et al. |
| 2002/0129362 A1 | 9/2002 | Chang et al. |
| 2003/0002862 A1 | 1/2003 | Rodriguez et al. |
| 2003/0014753 A1 | 1/2003 | Beach et al. |
| 2003/0030679 A1 | 2/2003 | Jain |
| 2003/0031465 A1 | 2/2003 | Blake |
| 2003/0037068 A1 | 2/2003 | Thomas et al. |
| 2003/0037332 A1 | 2/2003 | Chapin et al. |
| 2003/0061619 A1 | 3/2003 | Giammaressi |
| 2003/0067554 A1 | 4/2003 | Klarfeld et al. |
| 2003/0074214 A1 | 4/2003 | Kelliher |
| 2003/0074257 A1 | 4/2003 | Saveliev et al. |
| 2003/0079227 A1 | 4/2003 | Knowles et al. |
| 2003/0088872 A1 * | 5/2003 | Maissel et al. .................. 725/46 |
| 2003/0101451 A1 | 5/2003 | Bentolila et al. |
| 2003/0101454 A1 | 5/2003 | Ozer et al. |
| 2003/0124973 A1 | 7/2003 | Sie et al. |

| | | |
|---|---|---|
| 2003/0126425 A1 | 7/2003 | Yang et al. |
| 2003/0131356 A1 | 7/2003 | Proehl et al. |
| 2003/0135853 A1 | 7/2003 | Goldman et al. |
| 2003/0154475 A1 | 8/2003 | Rodriguez et al. |
| 2003/0154486 A1 | 8/2003 | Dunn et al. |
| 2003/0159147 A1 | 8/2003 | Young et al. |
| 2003/0174243 A1 | 9/2003 | Arbeiter et al. |
| 2003/0188313 A1 | 10/2003 | Ellis et al. |
| 2003/0193486 A1 | 10/2003 | Estrop |
| 2003/0206553 A1 | 11/2003 | Surcouf et al. |
| 2003/0219228 A1 | 11/2003 | Thiagarajan et al. |
| 2003/0221194 A1 | 11/2003 | Thiagarajan et al. |
| 2004/0034867 A1 | 2/2004 | Rashkovskiy et al. |
| 2004/0049787 A1 | 3/2004 | Maissel et al. |
| 2004/0107436 A1 | 6/2004 | Ishizaki |
| 2004/0117831 A1 | 6/2004 | Ellis et al. |
| 2004/0128685 A1 | 7/2004 | Hassell et al. |
| 2004/0133907 A1 | 7/2004 | Rodriguez et al. |
| 2004/0163117 A1 | 8/2004 | Rodriguez et al. |
| 2004/0168191 A1 | 8/2004 | Jerding et al. |
| 2004/0181801 A1 | 9/2004 | Hagen et al. |
| 2004/0221310 A1 | 11/2004 | Herrington et al. |
| 2004/0261112 A1 | 12/2004 | Hicks et al. |
| 2004/0261125 A1 | 12/2004 | Ellis et al. |
| 2005/0008074 A1 | 1/2005 | van Beek et al. |
| 2005/0028190 A1 | 2/2005 | Rodriguez et al. |
| 2005/0044565 A1 | 2/2005 | Jerding et al. |
| 2005/0044566 A1 | 2/2005 | Jerding et al. |
| 2005/0044577 A1 | 2/2005 | Jerding et al. |
| 2005/0071882 A1 | 3/2005 | Rodriguez et al. |
| 2005/0076360 A1 | 4/2005 | Jerding et al. |
| 2005/0091693 A1 | 4/2005 | Amine et al. |
| 2005/0111046 A1 | 5/2005 | Kurumisawa et al. |
| 2005/0138657 A1 | 6/2005 | Leftwich |
| 2005/0155056 A1 | 7/2005 | Knee et al. |
| 2005/0160468 A1 | 7/2005 | Rodriguez et al. |
| 2005/0188415 A1 | 8/2005 | Riley |
| 2005/0204387 A1 | 9/2005 | Knudson et al. |
| 2005/0204388 A1 | 9/2005 | Knudson et al. |
| 2005/0213506 A1 | 9/2005 | Wakumoto et al. |
| 2005/0216936 A1 | 9/2005 | Knudson et al. |
| 2005/0240961 A1 | 10/2005 | Jerding et al. |
| 2005/0251822 A1 | 11/2005 | Knowles et al. |
| 2005/0278741 A1 | 12/2005 | Robarts et al. |
| 2005/0283797 A1 | 12/2005 | Eldering et al. |
| 2005/0283810 A1* | 12/2005 | Ellis et al. ................ 725/93 |
| 2005/0289618 A1 | 12/2005 | Hardin |
| 2006/0020982 A1 | 1/2006 | Jerding et al. |
| 2006/0026080 A1 | 2/2006 | Rodriguez et al. |
| 2006/0026665 A1 | 2/2006 | Rodriguez et al. |
| 2006/0059525 A1 | 3/2006 | Jerding et al. |
| 2006/0070107 A1 | 3/2006 | Renkis |
| 2006/0088105 A1 | 4/2006 | Shen et al. |
| 2006/0112434 A1 | 5/2006 | Banker et al. |
| 2006/0206913 A1 | 9/2006 | Jerding et al. |
| 2006/0271933 A1 | 11/2006 | Agassi et al. |
| 2006/0271964 A1 | 11/2006 | Rodriguez et al. |
| 2006/0271973 A1 | 11/2006 | Jerding et al. |
| 2007/0019670 A1 | 1/2007 | Falardeau |
| 2007/0053293 A1 | 3/2007 | McDonald et al. |
| 2007/0094690 A1 | 4/2007 | Rodriguez et al. |
| 2007/0136748 A1 | 6/2007 | Rodriguez et al. |
| 2007/0186240 A1 | 8/2007 | Ward, III et al. |
| 2008/0010658 A1 | 1/2008 | Abbott et al. |
| 2008/0098421 A1 | 4/2008 | Rodriguez et al. |
| 2008/0098422 A1 | 4/2008 | Rodriguez et al. |
| 2008/0101460 A1 | 5/2008 | Rodriguez |
| 2008/0104637 A1 | 5/2008 | Rodriguez et al. |
| 2008/0137755 A1 | 6/2008 | Onur et al. |
| 2008/0155631 A1 | 6/2008 | Liwerant et al. |
| 2008/0229361 A1 | 9/2008 | Jerding et al. |
| 2008/0279217 A1 | 11/2008 | McDonald et al. |
| 2008/0281968 A1 | 11/2008 | Rodriguez |
| 2008/0282307 A1 | 11/2008 | McDonald et al. |
| 2008/0282308 A1 | 11/2008 | McDonald et al. |
| 2009/0141794 A1 | 6/2009 | Rodriguez et al. |
| 2009/0150958 A1 | 6/2009 | Jerding et al. |
| 2009/0158306 A1 | 6/2009 | Rodriguez et al. |
| 2009/0158324 A1 | 6/2009 | Rodriguez et al. |
| 2009/0158329 A1 | 6/2009 | Rodriguez et al. |
| 2009/0158331 A1 | 6/2009 | Rodriguez et al. |
| 2009/0158332 A1 | 6/2009 | Rodriguez et al. |
| 2009/0158335 A1 | 6/2009 | Rodriguez et al. |
| 2009/0158339 A1 | 6/2009 | Rodriguez et al. |
| 2009/0158352 A1 | 6/2009 | Rodriguez et al. |
| 2009/0158354 A1 | 6/2009 | Rodriguez et al. |
| 2009/0158355 A1 | 6/2009 | Rodriguez et al. |
| 2009/0158363 A1 | 6/2009 | Rodriguez et al. |
| 2009/0183081 A1 | 7/2009 | Rodriguez et al. |
| 2009/0190028 A1 | 7/2009 | Rodriguez et al. |
| 2009/0193468 A1 | 7/2009 | Rodriguez |
| 2009/0193471 A1 | 7/2009 | Rodriguez |
| 2009/0276808 A1 | 11/2009 | Jerding et al. |
| 2009/0282372 A1 | 11/2009 | Jerding et al. |
| 2009/0282440 A1 | 11/2009 | Rodriguez |
| 2010/0242063 A1 | 9/2010 | Slaney et al. |
| 2012/0188445 A1 | 7/2012 | Rodriguez et al. |
| 2012/0233654 A1 | 9/2012 | McDonald et al. |
| 2012/0240147 A1 | 9/2012 | Rodriguez |

FOREIGN PATENT DOCUMENTS

| | | |
|---|---|---|
| CA | 2 475 723 C | 1/2011 |
| EP | 0 572 090 A2 | 12/1993 |
| EP | 0 673 159 A1 | 9/1995 |
| EP | 0 680 214 A2 | 11/1995 |
| EP | 0 725 538 A2 | 8/1996 |
| EP | 0 763 936 A2 | 3/1997 |
| EP | 0 811 939 A2 | 12/1997 |
| EP | 0 838 915 A2 | 4/1998 |
| EP | 0 849 948 A2 | 6/1998 |
| EP | 0 854 645 A2 | 7/1998 |
| EP | 0 891 084 A2 | 1/1999 |
| EP | 0 896 318 A2 | 2/1999 |
| EP | 0 909 095 A1 | 4/1999 |
| EP | 0 701 756 B1 | 12/1999 |
| EP | 0 989 751 A2 | 3/2000 |
| EP | 1 069 801 A1 | 1/2001 |
| EP | 1 075 143 A1 | 2/2001 |
| EP | 1 111 572 A2 | 6/2001 |
| EP | 1 161 085 A1 | 12/2001 |
| GB | 2 343 051 A | 4/2000 |
| JP | 8-289219 | 11/1996 |
| JP | 9-322022 | 12/1997 |
| JP | 10-143734 | 5/1998 |
| JP | 11-73361 | 3/1999 |
| JP | 11-73394 | 3/1999 |
| JP | 11-164284 | 6/1999 |
| WO | WO 92/22983 | 12/1992 |
| WO | WO 94/14284 | 6/1994 |
| WO | WO 96/17467 | 6/1996 |
| WO | WO 96/33579 | 10/1996 |
| WO | WO 96/34486 | 10/1996 |
| WO | WO 96/34491 | 10/1996 |
| WO | WO 96/41477 | 12/1996 |
| WO | WO 96/41478 | 12/1996 |
| WO | WO 97/34414 | 9/1997 |
| WO | WO 98/03012 | 1/1998 |
| WO | WO 98/26528 | 6/1998 |
| WO | WO 98/31116 | 7/1998 |
| WO | WO 98/37695 | 8/1998 |
| WO | WO 98/39893 | 9/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 98/56188 | 12/1998 |
| WO | WO 99/01984 | 1/1999 |
| WO | WO 99/04560 | 1/1999 |
| WO | WO 99/04561 | 1/1999 |
| WO | WO 99/12109 | 3/1999 |
| WO | WO 99/14947 | 3/1999 |
| WO | WO 99/35831 | 7/1999 |
| WO | WO 99/45701 | 9/1999 |
| WO | WO 99/49717 | 10/1999 |
| WO | WO 99/52285 | 10/1999 |
| WO | WO 99/57903 | 11/1999 |
| WO | WO 99/60790 | 11/1999 |
| WO | WO 99/66719 | 12/1999 |

| | | |
|---|---|---|
| WO | WO 00/02385 | 1/2000 |
| WO | WO 00/04726 | 1/2000 |
| WO | WO 00/05889 | 2/2000 |
| WO | WO 00/30354 | 5/2000 |
| WO | WO 00/40017 | 7/2000 |
| WO | WO 00/46988 | 8/2000 |
| WO | WO 00/49801 | 8/2000 |
| WO | WO 00/59202 | 10/2000 |
| WO | WO 00/60482 | 10/2000 |
| WO | WO 00/78031 A2 | 12/2000 |
| WO | WO 00/78045 A1 | 12/2000 |
| WO | WO 00/78047 A1 | 12/2000 |
| WO | WO 00/78048 A1 | 12/2000 |
| WO | WO 01/06788 A1 | 1/2001 |
| WO | WO 01/20907 A1 | 3/2001 |
| WO | WO 01/24067 A1 | 4/2001 |
| WO | WO 01/56273 A1 | 8/2001 |
| WO | WO 01/67736 A2 | 9/2001 |
| WO | WO 01/72042 A1 | 9/2001 |
| WO | WO 01/76245 A2 | 10/2001 |
| WO | WO 01/77888 A2 | 10/2001 |
| WO | WO 01/84831 A2 | 11/2001 |
| WO | WO 02/097584 A2 | 12/2002 |
| WO | WO 03/003164 A2 | 1/2003 |
| WO | WO 03/003709 A2 | 1/2003 |
| WO | WO 03/014873 A2 | 2/2003 |
| WO | WO 03/024084 A2 | 3/2003 |
| WO | WO 03/042787 A2 | 5/2003 |
| WO | WO 03/069898 A1 | 8/2003 |
| WO | WO 2004/091219 A1 | 10/2004 |
| WO | WO 2004/100500 A2 | 11/2004 |
| WO | WO 2005/059202 A1 | 6/2005 |
| WO | WO 2005/071658 A1 | 8/2005 |
| WO | WO 2007/030370 A1 | 3/2007 |

OTHER PUBLICATIONS

"Client User Interface Specification (Phase I) for Video-On-Demand Application Development on the Explorer 2000 ™ Digital Home Communications Terminal", Revision 1.10 (Aug. 31, 1998).
"Evidence of illustrative movie release years," Retrieved from the Internet Movie Database using Internet, http://www.imdb.com, 19 pages (Retrieved on Jun. 6, 2005).
"ISO/IEC 13818-6 Information technology—Generic coding of moving pictures and associated audio information—Part 6: Extensions for DSM-CC," Chapter 4, 113 pages (Sep. 1, 1998).
"Netcaster Developer's Guide," Devedge Online Documentation, Netscape Communications Corporation, http://developer.netscape.com/docs/manuals/netcast/devguide/ index.html, XP-002166370, 82 pages (Sep. 25, 1997).
"Netscape Navigator Help," Netscape Navigator Software User Documentation, Netscape Communications Corporation, http://home.netscape.com, XP-002166369, pp. 1-63 (Aug. 10, 1997).
"Sez You . . . origin of word daemon," Take Our Word For It, Issue 146, p. 4, http://www.takeourword.com/TOW146/page4.html (retrieved on Apr. 4, 2006).
Addington, Timothy H., "System Architecture Specification for Video-On-Demand Application Development on the Explorer 2000™ Digital Home Communications Terminal", Revision 1.10r (Mar. 4, 1999).
Alberico, G. et al., "Satellite Interactive Multimedia: A New Opportunity for Broadcasters," International Broadcasting Convention, Conference Publication No. 447, pp. 18-23 (Sep. 12-16, 1997).
ATI Multimedia Center 7.9, User's Guide, ATI Technologies Inc., pp. i-vi and 1-96 (Copyright 2002).
Barth et al., "10 Fernsehen am Pc", Suse GmbH, XP-002324319, pp. 143-149 (2001).
BPAI Decision for U.S. Appl. No. 09/692,995, mailed Aug. 20, 2008.
BPAI Decision for U.S. Appl. No. 09/693,288, mailed Nov. 28, 2007.
Canadian Office Action cited in Application No. 2,376,556 mailed Sep. 30, 2008.
Canadian Office Action cited in Application No. 2,376,556 mailed Nov. 23, 2007.
Canadian Office Action cited in Application No. 2,376,556 mailed Dec. 6, 2005.
Canadian Office Action cited in Application No. 2,402,088 mailed Jun. 1, 2010.
Canadian Office Action cited in Application No. 2,402,088 mailed May 30, 2006.
Canadian Office Action cited in Application No. 2,405,491 mailed Jun. 9, 2010.
Canadian Office Action cited in Application No. 2,405,491 mailed Apr. 3, 2009.
Canadian Office Action cited in Application No. 2,405,491 mailed May 22, 2008.
Canadian Office Action cited in Application No. 2,405,491 mailed Jun. 20, 2007.
Canadian Office Action cited in Application No. 2,405,491 mailed Jan. 20, 2006.
Canadian Office Action cited in Application No. 2,408,289 mailed Sep. 2, 2010, 3 pages.
Canadian Office Action cited in Application No. 2,408,289 mailed Aug. 27, 2008.
Canadian Office Action cited in Application No. 2,408,289 mailed May 30, 2006.
Canadian Office Action cited in Application No. 2,451,477 mailed Nov. 3, 2009.
Canadian Office Action cited in Application No. 2,456,318 mailed Nov. 17, 2010, 4 pages.
Canadian Office Action cited in Application No. 2,456,318 mailed May 5, 2008.
Canadian Office Action cited in Application No. 2,456,318 mailed Mar. 27, 2007.
Canadian Office Action cited in Application No. 2,459,334 mailed Mar. 4, 2011, 3 pages.
Canadian Office Action cited in Application No. 2,459,334 mailed Apr. 16, 2009.
Canadian Office Action cited in Application No. 2,466,667 mailed Apr. 15, 2009.
Canadian Office Action cited in Application No. 2,475,723 mailed Jul. 7, 2009.
Canadian Office Action cited in Application No. 2,554,208 mailed Apr. 1, 2010.
Canadian Office Action cited in Application No. 2,621,605 mailed Dec. 15, 2009.
Canadian Office Action cited in Application No. 2,451,477 mailed Oct. 20, 2010, 4 pages.
Cunningham et al., "5 Das X Window System"., Suse GmbH, XP-002324320, pp. 129-180 (2001).
Decision on Appeal affirmed cited in U.S. Appl. No. 09/590,434 mailed May 28, 2008.
Definition of "flag", Microsoft Press: Computer User's Dictionary, 3 pages (1998).
Definition of "renting", Webster's II: New College Dictionary, 1995, Houghton Mifflin Company, p. 939.
European Examination Report cited in Application No. 00 938 251.6 mailed Mar. 2, 2010.
European Examination Report cited in Application No. 00 938 251.6 mailed Nov. 2, 2007.
European Examination Report cited in Application No. 00 939 759.7 mailed May 10, 2007.
European Examination Report cited in Application No. 01 905 058.2 mailed Dec. 19, 2006.
European Examination Report cited in Application No. 01 922 261.1 mailed Jul. 18, 2008.
European Examination Report cited in Application No. 01 922 261.1 mailed Nov. 2, 2007.
European Examination Report cited in Application No. 01 922 261.1 mailed Jan. 24, 2007.
European Examination Report cited in Application No. 01 922 261.1 mailed May 26, 2006.
European Examination Report cited in Application No. 01 923 092.9 mailed Jul. 20, 2009.
European Examination Report cited in Application No. 01 923 092.9 mailed Nov. 27, 2008.
European Examination Report cited in Application No. 01 937 209.3 mailed Mar. 16, 2010.

European Examination Report cited in Application No. 01 937 209.3 mailed Jun. 23, 2008.
European Examination Report cited in Application No. 02 737 593.0 mailed May 6, 2009.
European Examination Report cited in Application No. 02 750 416.6 mailed Aug. 4, 2008.
European Examination Report cited in Application No. 02 750 416.6 mailed Aug. 28, 2007.
European Examination Report cited in Application No. 02 761 572.3 mailed Apr. 20, 2009.
European Examination Report cited in Application No. 02 761 572.3 mailed Sep. 22, 2008.
European Examination Report cited in Application No. 02 761 572.3 mailed Jan. 22, 2008.
European Examination Report cited in Application No. 02 761 572.3 mailed Aug. 29, 2007.
European Examination Report cited in Application No. 06 802 683.0 mailed Jun. 26, 2008.
Examiner's Answer to Appeal Brief cited in U.S. Appl. No. 09/590,488 mailed Jan. 11, 2008.
"Industry Leading Software Vendors Endorse BroadVision's Next Generation of Retail and Business-To-Business E-Commerce Application Solutions," PR Newswire, Jun. 14, 1999, 4 pages.
Japanese Office Action cited in Application No. 2001-581527 mailed Feb. 10, 2010.
Japanese Office Action cited in Application No. 2001-581527 mailed Sep. 8, 2009.
Kevin, "Change Screen Resolution in Windows (Tips, Tricks, Tweaks, and Setting)," http://www.tacktech.com/display.cfm?tid=207, pp. 1-3 (Oct. 26, 2002).
Little et al., "Prospects for Interactive Video-On-Demand", IEEE Multimedia, IEEE Service Center, New York, NY US, vol. 1 No. 3, Sep. 1994, pp. 14-24, XP000476885 ISSN: 1070-986X.
McFedries, "The Complete Idiot's Guide to Windows 95," Que, 2nd Edition, p. 49 (1997).
PCT Search Report cited in International Application No. PCT/US00/15952 mailed Jan. 16, 2001.
PCT Search Report cited in International Application No. PCT/US00/15963 mailed Sep. 1, 2000.
PCT Search Report cited in International Application No. PCT/US00/16000 mailed Oct. 2, 2000.
PCT Search Report cited in International Application No. PCT/US01/02490 mailed May 18, 2001.
PCT Search Report cited in International Application No. PCT/US01/06663 mailed Oct. 18, 2001.
PCT Search Report cited in International Application No. PCT/US01/10874 mailed Nov. 29, 2001.
PCT Search Report cited in International Application No. PCT/US01/14150 mailed Apr. 29, 2002.
PCT Search Report cited in International Application No. PCT/US02/20307 mailed Jan. 3, 2003.
PCT Search Report cited in International Application No. PCT/US02/20519 mailed Apr. 7, 2003.
PCT Search Report cited in International Application No. PCT/US02/24704 mailed Mar. 5, 2003.
PCT Search Report cited in International Application No. PCT/US02/28212 mailed Jan. 23, 2003.
PCT Search Report cited in International Application No. PCT/US02/36291 mailed May 23, 2003.
PCT Search Report cited in International Application No. PCT/US03/03391 mailed Jul. 14, 2003.
PCT Search Report and Written Opinion cited in International Application No. PCT/US2005/001812 mailed May 2, 2005.
PCT Search Report and Written Opinion cited in International Application No. PCT/US2006/033965 mailed Feb. 9, 2007.
PCT Search Report and Written Opinion cited in International Application No. PCT/US2006/033965 Feb. 19, 2007.
PCT Written Opinion cited in International Application No. PCT/US00/15952 mailed Jul. 25, 2001.
PCT Written Opinion cited in International Application No. PCT/US00/15963 mailed Jun. 22, 2001.
PCT Written Opinion cited in International Application No. PCT/US00/16000 mailed Oct. 25, 2001.
PCT Written Opinion cited in International Application No. PCT/US01/02490 mailed Oct. 23, 2001.
PCT Written Opinion cited in International Application No. PCT/US01/06663 mailed Jan. 3, 2002.
PCT Written Opinion cited in International Application No. PCT/US01/10874 mailed Jun. 4, 2002.
PCT Written Opinion cited in International Application No. PCT/US01/14150 mailed Sep. 30, 2004.
PCT Written Opinion cited in International Application No. PCT/US02/20307 mailed Aug. 8, 2003.
PCT Written Opinion cited in International Application No. PCT/US02/20519 mailed Apr. 6, 2004.
PCT Written Opinion cited in International Application No. PCT/US02/24704 mailed Nov. 20, 2003.
PCT Written Opinion cited in International Application No. PCT/US02/28212 mailed Dec. 4, 2003.
Summons to attend oral proceedings in EP Application No. 01937209.3 mailed Mar. 21, 2011, 7 pages.
Petit et al., "Bandwidth Resource Optimization in Video-On-Demand Network Architectures", Community Networking Integrated Multimedia Services to the Home, 1994, Proceedings of the 1st International Workshop on San Francisco, CA USA, Jul. 1994, New York, NY USA, IEEE, Jul. 1994, pp. 91-97, XP010124402 ISBN: 978-0/7803-2076-5.
Reid, Dixie, "Coming attractions before they hit the big screen, most films begin life as a trailer," The Sacramento Bee, Sacramento, California, p. E.1 (Jul. 18, 1996).
Remote Wonder, ATI, Tweak 3D, pp. 1-5 (Sep. 30, 2002).
Reply Brief in U.S. Appl. No. 09/565,931 mailed on Sep. 17, 2007.
Rottentomatoes web archived site, http://web.archive.org/web/20000301122211/http://rottentomatoes.com, Mar. 1, 2000, pp. 1-2.
Summons to attend oral proceedings pursuant to Rule 115(1) EPC in European Application No. 02737593.0-1241 mailed May 28, 2010.
Supplementary European Search Report cited in European Application No. 02737593.0 mailed Mar. 3, 2009.
Supplementary European Search Report cited in European Application No. 02744705.1 mailed Feb. 19, 2010.
Supplementary European Search Report cited in European Application No. 02750416.6 mailed Jan. 2, 2007.
Supplementary European Search Report cited in European Application No. 02761572.3 mailed Mar. 20, 2007.
Supplementary European Search Report cited in European Application No. 02797096.1 mailed Oct. 14, 2005.
Supplementary European Search Report cited in European Application No. 03713364.2 mailed Jul. 6, 2005.
Canadian Office Action dated May 31, 2011 cited in Application No. 2,621,605 2 pages.
Canadian Office Action dated Jul. 11, 2011 cited in Application No. 2,554,208.
European Office Action dated Oct. 10, 2011 cited in Application No. 02744705.1.
Canadian Office Action dated Oct. 17, 2011 cited in Application No. 2,402,088.
Summons to attend oral proceedings mailed Dec. 29, 2011 in Application No. 00939759.7, 9 pages.
Summons to attend oral proceedings mailed Jul. 31, 2012 in Application No. 02744705.1, 5 pages.
U.S. Final Office Action cited in U.S. Appl. No. 09/518,041 mailed Jul. 7, 2008.
U.S. Non-Final Office Action cited in U.S. Appl. No. 09/518,041 mailed Jan. 10, 2008.
U.S. Final Office Action cited in U.S. Appl. No. 09/518,041 mailed Aug. 24, 2007.
U.S. Non-Final Office Action cited in U.S. Appl. No. 09/518,041 mailed Feb. 6, 2007.
U.S. Final Office Action cited in U.S. Appl. No. 09/518,041 mailed Aug. 28, 2006.
U.S. Non-Final Office Action cited in U.S. Appl. No. 09/518,041 mailed Apr. 4, 2006.
U.S. Final Office Action cited in U.S. Appl. No. 09/518,041 mailed Sep. 15, 2005.
U.S. Non-Final Office Action cited in U.S. Appl. No. 09/518,041 mailed Apr. 22, 2005.

U.S. Final Office Action cited in U.S. Appl. No. 09/518,041 mailed Oct. 20, 2004.
U.S. Non-Final Office Action cited in U.S. Appl. No. 09/518,041 mailed Feb. 11, 2004.
U.S. Final Office Action cited in U.S. Appl. No. 09/518,041 mailed Aug. 27, 2003.
U.S. Non-Final Office Action cited in U.S. Appl. No. 09/518,041 mailed Mar. 18, 2003.
U.S. Final Office Action cited in U.S. Appl. No. 09/542,484 mailed Jun. 17, 2008.
U.S. Non-Final Office Action cited in U.S. Appl. No. 09/542,484 mailed Dec. 7, 2007.
U.S. Non-Final Office Action cited in U.S. Appl. No. 09/542,484 mailed Mar. 12, 2007.
U.S. Non-Final Office Action cited in U.S. Appl. No. 09/542,484 mailed Sep. 7, 2006.
U.S. Final Office Action cited in U.S. Appl. No. 09/542,484 mailed Mar. 21, 2006.
U.S. Non-Final Office Action cited in U.S. Appl. No. 09/542,484 mailed Jul. 28, 2005.
U.S. Final Office Action cited in U.S. Appl. No. 09/542,484 mailed Mar. 22, 2005.
U.S. Non-Final Office Action cited in U.S. Appl. No. 09/542,484 mailed Apr. 1, 2004.
U.S. Non-Final Office Action cited in U.S. Appl. No. 09/565,931 mailed Oct. 28, 2009.
U.S. Final Office Action cited in U.S. Appl. No. 09/565,931 mailed Jul. 14, 2009.
U.S. Non-Final Office Action cited in U.S. Appl. No. 09/565,931 mailed Feb. 13, 2009.
U.S. Final Office Action cited in U.S. Appl. No. 09/565,931 mailed Jun. 15, 2006.
U.S. Non-Final Office Action cited in U.S. Appl. No. 09/565,931 mailed Jan. 11, 2006.
U.S. Final Office Action cited in U.S. Appl. No. 09/565,931 mailed Jul. 1, 2005.
U.S. Non-Final Office Action cited in U.S. Appl. No. 09/565,931 mailed Sep. 10, 2004.
U.S. Final Office Action cited in U.S. Appl. No. 09/590,434 mailed May 11, 2006.
U.S. Non-Final Office Action cited in U.S. Appl. No. 09/590,434 mailed Nov. 21, 2005.
U.S. Final Office Action cited in U.S. Appl. No. 09/590,434 mailed Dec. 1, 2004.
U.S. Non-Final Office Action cited in U.S. Appl. No. 09/590,434 mailed Apr. 22, 2004.
U.S. Final Office Action cited in U.S. Appl. No. 09/590,434 mailed Dec. 18, 2003.
U.S. Non-Final Office Action cited in U.S. Appl. No. 09/590,434 mailed May 23, 2003.
U.S. Final Office Action cited in U.S. Appl. No. 09/590,488 mailed Feb. 27, 2007.
U.S. Non-Final Office Action cited in U.S. Appl. No. 09/590,488 mailed Oct. 26, 2006.
U.S. Final Office Action cited in U.S. Appl. No. 09/590,488 mailed Jul. 10, 2006.
U.S. Non-Final Office Action cited in U.S. Appl. No. 09/590,488 mailed Dec. 20, 2005.
U.S. Final Office Action cited in U.S. Appl. No. 09/590,488 mailed Jun. 30, 2005.
U.S. Non-Final Office Action cited in U.S. Appl. No. 09/590,488 mailed Nov. 16, 2004.
U.S. Final Office Action cited in U.S. Appl. No. 09/590,488 mailed Jun. 7, 2004.
U.S. Final Office Action cited in U.S. Appl. No. 09/590,488 mailed Dec. 16, 2003.
U.S. Non-Final Office Action cited in U.S. Appl. No. 09/590,488 mailed Jun. 10, 2003.
U.S. Final Office Action cited in U.S. Appl. No. 09/590,904 mailed Sep. 13, 2007.
U.S. Non-Final Office Action cited in U.S. Appl. No. 09/590,904 mailed Mar. 26, 2007.
U.S. Final Office Action cited in U.S. Appl. No. 09/590,904 mailed Nov. 15, 2006.
U.S. Non-Final Office Action cited in U.S. Appl. No. 09/590,904 mailed May 31, 2006.
U.S. Final Office Action cited in U.S. Appl. No. 09/590,904 mailed Jan. 24, 2006.
U.S. Non-Final Office Action cited in U.S. Appl. No. 09/590,904 mailed Jul. 13, 2005.
U.S. Final Office Action cited in U.S. Appl. No. 09/590,904 mailed Jan. 11, 2005.
U.S. Non-Final Office Action cited in U.S. Appl. No. 09/590,904 mailed Jun. 4, 2004.
U.S. Final Office Action cited in U.S. Appl. No. 09/591,356 mailed Apr. 13, 2006.
U.S. Non-Final Office Action cited in U.S. Appl. No. 09/591,356 mailed Dec. 20, 2005.
U.S. Final Office Action cited in U.S. Appl. No. 09/591,356 mailed Jun. 30, 2005.
U.S. Final Office Action cited in U.S. Appl. No. 09/591,356 mailed May 10, 2004.
U.S. Non-Final Office Action cited in U.S. Appl. No. 09/591,356 mailed Jan. 14, 2004.
U.S. Final Office Action cited in U.S. Appl. No. 09/591,356 mailed Sep. 26, 2003.
U.S. Non-Final Office Action cited in U.S. Appl. No. 09/591,356 mailed May 21, 2003.
U.S. Final Office Action cited in U.S. Appl. No. 09/692,920 mailed Jul. 22, 2008.
U.S. Non-Final Office Action cited in U.S. Appl. No. 09/692,920 mailed Jan. 17, 2008.
U.S. Final Office Action cited in U.S. Appl. No. 09/692,920 mailed Jun. 14, 2007.
U.S. Non-Final Office Action cited in U.S. Appl. No. 09/692,920 mailed Nov. 24, 2006.
U.S. Final Office Action cited in U.S. Appl. No. 09/692,920 mailed Jun. 21, 2006.
U.S. Non-Final Office Action cited in U.S. Appl. No. 09/692,920 mailed Feb. 16, 2006.
U.S. Final Office Action cited in U.S. Appl. No. 09/692,920 mailed Jun. 17, 2005.
U.S. Non-Final Office Action cited in U.S. Appl. No. 09/692,920 mailed Nov. 18, 2004.
U.S. Final Office Action cited in U.S. Appl. No. 09/692,995 mailed Sep. 4, 2009.
U.S. Non-Final Office Action cited in U.S. Appl. No. 09/692,995 mailed Jan. 23, 2009.
U.S. Final Office Action cited in U.S. Appl. No. 09/692,995 mailed Sep. 8, 2006.
U.S. Non-Final Office Action cited in U.S. Appl. No. 09/692,995 mailed Mar. 27, 2006.
U.S. Final Office Action cited in U.S. Appl. No. 09/692,995 mailed Sep. 21, 2005.
U.S. Final Office Action cited in U.S. Appl. No. 09/692,995 mailed May 3, 2005.
U.S. Non-Final Office Action cited in U.S. Appl. No. 09/692,995 mailed Oct. 21, 2004.
U.S. Final Office Action cited in U.S. Appl. No. 09/692,995 mailed Apr. 26, 2004.
U.S. Non-Final Office Action cited in U.S. Appl. No. 09/692,995 mailed Dec. 5, 2003.
U.S. Final Office Action cited in U.S. Appl. No. 09/693,115 mailed Jan. 25, 2005.
U.S. Non-Final Office Action cited in U.S. Appl. No. 09/693,115 mailed Jun. 16, 2004.
U.S. Final Office Action cited in U.S. Appl. No. 09/693,115 mailed Feb. 9, 2004.
U.S. Non-Final Office Action cited in U.S. Appl. No. 09/693,115 mailed Sep. 26, 2003.
U.S. Final Office Action cited in U.S. Appl. No. 09/693,288 mailed Feb. 8, 2011, 28 pages.
U.S. Non-Final Office Action cited in U.S. Appl. No. 09/693,288 mailed Jun. 21, 2010.

U.S. Final Office Action cited in U.S. Appl. No. 09/693,288 mailed Dec. 1, 2005.
U.S. Non-Final Office Action cited in U.S. Appl. No. 09/693,288 mailed Jul. 19, 2005.
U.S. Final Office Action cited in U.S. Appl. No. 09/693,288 mailed Feb. 10, 2005.
U.S. Non-Final Office Action cited in U.S. Appl. No. 09/693,288 mailed Jul. 15, 2004.
U.S. Final Office Action cited in U.S. Appl. No. 09/693,288 mailed Feb. 26, 2004.
U.S. Non-Final Office Action cited in U.S. Appl. No. 09/693,288 mailed Oct. 27, 2003.
U.S. Final Office Action cited in U.S. Appl. No. 09/881,516 mailed Jun. 3, 2005.
U.S. Non-Final Office Action cited in U.S. Appl. No. 09/881,516 mailed Dec. 29, 2004.
U.S. Final Office Action cited in U.S. Appl. No. 09/881,516 mailed Jul. 26, 2004.
U.S. Final Office Action cited in U.S. Appl. No. 09/881,516 mailed Apr. 21, 2004.
U.S. Non-Final Office Action cited in U.S. Appl. No. 09/881,516 mailed Oct. 28, 2003.
U.S. Final Office Action cited in U.S. Appl. No. 09/894,508 mailed Sep. 17, 2009.
U.S. Non-Final Office Action cited in U.S. Appl. No. 09/894,508 mailed Feb. 4, 2009.
U.S. Non-Final Office Action cited in U.S. Appl. No. 09/894,508 mailed Jun. 13, 2008.
U.S. Final Office Action cited in U.S. Appl. No. 09/894,508 mailed Dec. 31, 2007.
U.S. Non-Final Office Action cited in U.S. Appl. No. 09/894,508 mailed Jul. 26, 2007.
U.S. Final Office Action cited in U.S. Appl. No. 09/896,231 mailed May 28, 2010.
U.S. Non-Final Office Action cited in U.S. Appl. No. 09/896,231 mailed Nov. 17, 2009.
U.S. Non-Final Office Action cited in U.S. Appl. No. 09/896,231 mailed Jun. 3, 2009.
U.S. Non-Final Office Action cited in U.S. Appl. No. 09/896,231 mailed Dec. 23, 2008.
U.S. Final Office Action cited in U.S. Appl. No. 09/896,231 mailed Dec. 29, 2005.
U.S. Non-Final Office Action cited in U.S. Appl. No. 09/896,231 mailed Jun. 23, 2005.
U.S. Final Office Action cited in U.S. Appl. No. 09/924,111 mailed Aug. 7, 2008.
U.S. Non-Final Office Action cited in U.S. Appl. No. 09/924,111 mailed Jan. 29, 2008.
U.S. Final Office Action cited in U.S. Appl. No. 09/924,111 mailed Oct. 5, 2007.
U.S. Non-Final Office Action cited in U.S. Appl. No. 09/924,111 mailed Apr. 19, 2007.
U.S. Final Office Action cited in U.S. Appl. No. 09/924,111 mailed Sep. 18, 2006.
U.S. Non-Final Office Action cited in U.S. Appl. No. 09/924,111 mailed Mar. 15, 2006.
U.S. Final Office Action cited in U.S. Appl. No. 09/947,890 mailed Nov. 24, 2009.
U.S. Non-Final Office Action cited in U.S. Appl. No. 09/947,890 mailed Apr. 10, 2009.
U.S. Final Office Action cited in U.S. Appl. No. 09/947,890 mailed Nov. 6, 2008.
U.S. Non-Final Office Action cited in U.S. Appl. No. 09/947,890 mailed Jun. 25, 2008.
U.S. Non-Final Office Action cited in U.S. Appl. No. 10/740,138 mailed Oct. 27, 2010, 23 pages.
U.S. Final Office Action cited in U.S. Appl. No. 10/740,138 mailed Jan. 15, 2010.
U.S. Non-Final Office Action cited in U.S. Appl. No. 10/740,138 mailed Sep. 3, 2009.
U.S. Final Office Action cited in U.S. Appl. No. 10/740,138 mailed Mar. 19, 2009.
U.S. Non-Final Office Action cited in U.S. Appl. No. 10/740,138 mailed Sep. 15, 2008.
U.S. Final Office Action cited in U.S. Appl. No. 10/740,138 mailed Jun. 11, 2008.
U.S. Non-Final Office Action cited in U.S. Appl. No. 10/740,138 mailed Oct. 2, 2007.
U.S. Final Office Action cited in U.S. Appl. No. 10/761,777 mailed Aug. 2, 2010.
U.S. Non-Final Office Action cited in U.S. Appl. No. 10/761,777 mailed Jan. 21, 2010.
U.S. Non-Final Office Action cited in U.S. Appl. No. 10/761,777 mailed Jun. 11, 2009.
U.S. Final Office Action cited in U.S. Appl. No. 10/761,777 mailed Dec. 19, 2008.
U.S. Non-Final Office Action cited in U.S. Appl. No. 10/761,777 mailed Jul. 18, 2007.
U.S. Non-Final Office Action cited in U.S. Appl. No. 10/761,777 mailed Jan. 24, 2007.
U.S. Final Office Action cited in U.S. Appl. No. 10/778,494 mailed Jul. 25, 2008.
U.S. Non-Final Office Action cited in U.S. Appl. No. 10/778,494 mailed Jan. 16, 2008.
U.S. Final Office Action cited in U.S. Appl. No. 10/778,494 mailed May 22, 2007.
U.S. Non-Final Office Action cited in U.S. Appl. No. 10/778,494 mailed Feb. 2, 2007.
U.S. Final Office Action cited in U.S. Appl. No. 10/778,494 mailed Aug. 28, 2006.
U.S. Non-Final Office Action cited in U.S. Appl. No. 10/778,494 mailed Dec. 29, 2004.
U.S. Final Office Action cited in U.S. Appl. No. 10/783,235 mailed Oct. 2, 2008.
U.S. Non-Final Office Action cited in U.S. Appl. No. 10/783,235 mailed Feb. 25, 2008.
U.S. Non-Final Office Action cited in U.S. Appl. No. 10/934,253 mailed Nov. 4, 2010, 10 pages.
U.S. Non-Final Office Action cited in U.S. Appl. No. 10/934,253 mailed Apr. 27, 2010.
U.S. Final Office Action cited in U.S. Appl. No. 10/934,253 mailed Dec. 23, 2009.
U.S. Non-Final Office Action cited in U.S. Appl. No. 10/934,253 mailed Jun. 26, 2009.
U.S. Final Office Action cited in U.S. Appl. No. 10/934,253 mailed Dec. 26, 2008.
U.S. Non-Final Office Action cited in U.S. Appl. No. 10/934,253 mailed Jun. 17, 2008.
U.S. Final Office Action cited in U.S. Appl. No. 10/934,253 mailed Jul. 24, 2007.
U.S. Non-Final Office Action cited in U.S. Appl. No. 10/934,253 mailed Feb. 9, 2007.
U.S. Non-Final Office Action cited in U.S. Appl. No. 10/934,253 mailed Sep. 14, 2006.
U.S. Final Office Action cited in U.S. Appl. No. 10/957,849 mailed Aug. 8, 2008.
U.S. Non-Final Office Action cited in U.S. Appl. No. 10/957,849 mailed Apr. 30, 2008.
U.S. Final Office Action cited in U.S. Appl. No. 10/957,854 mailed Apr. 1, 2010.
U.S. Non-Final Office Action cited in U.S. Appl. No. 10/957,854 mailed Sep. 28, 2009.
U.S. Final Office Action cited in U.S. Appl. No. 10/957,854 mailed Apr. 7, 2009.
U.S. Non-Final Office Action cited in U.S. Appl. No. 10/957,854 mailed Oct. 15, 2008.
U.S. Non-Final Office Action cited in U.S. Appl. No. 10/957,854 mailed Apr. 30, 2008.
U.S. Non-Final Office Action cited in U.S. Appl. No. 10/957,942 mailed Jun. 30, 2010.
U.S. Final Office Action cited in U.S. Appl. No. 10/957,942 mailed Jul. 28, 2009.
U.S. Non-Final Office Action cited in U.S. Appl. No. 10/957,942 mailed Jan. 14, 2009.

U.S. Final Office Action cited in U.S. Appl. No. 10/957,942 mailed Jul. 31, 2008.
U.S. Non-Final Office Action cited in U.S. Appl. No. 10/957,942 mailed May 1, 2008.
U.S. Final Office Action cited in U.S. Appl. No. 10/981,053 mailed Jan. 21, 2010.
U.S. Non-Final Office Action cited in U.S. Appl. No. 10/981,053 mailed Apr. 15, 2009.
U.S. Final Office Action cited in U.S. Appl. No. 10/981,053 mailed Aug. 6, 2008.
U.S. Non-Final Office Action cited in U.S. Appl. No. 10/981,053 mailed Jan. 2, 2008.
U.S. Final Office Action cited in U.S. Appl. No. 10/994,599 mailed Dec. 1, 2006.
U.S. Non-Final Office Action cited in U.S. Appl. No. 10/994,599 mailed May 16, 2006.
U.S. Final Office Action cited in U.S. Appl. No. 10/994,599 mailed Jan. 26, 2006.
U.S. Non-Final Office Action cited in U.S. Appl. No. 10/994,599 mailed Aug. 23, 2005.
U.S. Non-Final Office Action cited in U.S. Appl. No. 11/162,345 mailed Feb. 1, 2011, 33 pages.
U.S. Final Office Action cited in U.S. Appl. No. 11/162,345 mailed Mar. 16, 2010.
U.S. Non-Final Office Action cited in U.S. Appl. No. 11/162,345 mailed Aug. 21, 2009.
U.S. Final Office Action cited in U.S. Appl. No. 11/162,345 mailed Mar. 9, 2009.
U.S. Non-Final Office Action cited in U.S. Appl. No. 11/162,345 mailed Oct. 31, 2008.
U.S. Non-Final Office Action cited in U.S. Appl. No. 11/170,348 mailed Oct. 26, 2010, 13 pages.
U.S. Final Office Action cited in U.S. Appl. No. 11/170,348 mailed Feb. 1, 2010.
U.S. Non-Final Office Action cited in U.S. Appl. No. 11/170,348 mailed Sep. 30, 2009.
U.S. Final Office Action cited in U.S. Appl. No. 11/170,348 mailed May 28, 2009.
U.S. Non-Final Office Action cited in U.S. Appl. No. 11/170,348 mailed Dec. 11, 2008.
U.S. Final Office Action cited in U.S. Appl. No. 11/208,387 mailed Dec. 22, 2008.
U.S. Non-Final Office Action cited in U.S. Appl. No. 11/208,387 mailed Jun. 12, 2008.
U.S. Non-Final Office Action cited in U.S. Appl. No. 11/234,967 mailed Sep. 10, 2010.
U.S. Final Office Action cited in U.S. Appl. No. 11/238,369 mailed Aug. 31, 2010.
U.S. Non-Final Office Action cited in U.S. Appl. No. 11/238,369 mailed Mar. 30, 2010.
U.S. Final Office Action cited in U.S. Appl. No. 11/244,621 mailed Aug. 18, 2010.
U.S. Non-Final Office Action cited in U.S. Appl. No. 11/244,621 mailed Feb. 5, 2010.
U.S. Final Office Action cited in U.S. Appl. No. 11/244,621 mailed Sep. 17, 2009.
U.S. Non-Final Office Action cited in U.S. Appl. No. 11/244,621 mailed Mar. 19, 2009.
U.S. Non-Final Office Action cited in U.S. Appl. No. 11/244,621 mailed Sep. 19, 2008.
U.S. Non-Final Office Action cited in U.S. Appl. No. 11/275,245 mailed May 5, 2010.
U.S. Non-Final Office Action cited in U.S. Appl. No. 11/275,245 mailed Oct. 22, 2009.
U.S. Final Office Action cited in U.S. Appl. No. 11/275,245 mailed Jul. 29, 2009.
U.S. Non-Final Office Action cited in U.S. Appl. No. 11/275,245 mailed Sep. 22, 2008.
U.S. Final Office Action cited in U.S. Appl. No. 11/460,516 mailed Mar. 18, 2010.
U.S. Non-Final Office Action cited in U.S. Appl. No. 11/460,516 mailed Jun. 26, 2009.
U.S. Final Office Action cited in U.S. Appl. No. 11/460,516 mailed Feb. 13, 2009.
U.S. Non-Final Office Action cited in U.S. Appl. No. 11/460,516 mailed Sep. 17, 2008.
U.S. Final Office Action cited in U.S. Appl. No. 11/496,303 mailed Jul. 22, 2010.
U.S. Non-Final Office Action cited in U.S. Appl. No. 11/496,303 mailed Mar. 2, 2010.
U.S. Non-Final Office Action cited in U.S. Appl. No. 11/496,303 mailed Sep. 29, 2009.
U.S. Final Office Action cited in U.S. Appl. No. 11/496,303 mailed Apr. 1, 2009.
U.S. Non-Final Office Action cited in U.S. Appl. No. 11/496,303 mailed Sep. 18, 2008.
U.S. Non-Final Office Action cited in U.S. Appl. No. 11/564,431 mailed Jul. 20, 2010.
U.S. Final Office Action cited in U.S. Appl. No. 11/564,431 mailed Jan. 4, 2010.
U.S. Non-Final Office Action cited in U.S. Appl. No. 11/564,431 mailed Aug. 24, 2009.
U.S. Final Office Action cited in U.S. Appl. No. 11/678,653 mailed Jun. 23, 2010.
U.S. Non-Final Office Action cited in U.S. Appl. No. 11/678,653 mailed Dec. 16, 2009.
U.S. Non-Final Office Action cited in U.S. Appl. No. 11/963,942 mailed Jun. 8, 2010.
U.S. Non-Final Office Action cited in U.S. Appl. No. 11/963,945 mailed Jul. 16, 2010.
U.S. Non-Final Office Action cited in U.S. Appl. No. 11/963,951 mailed Aug. 2, 2010.
U.S. Final Office Action cited in U.S. Appl. No. 12/127,968 mailed Sep. 14, 2010.
U.S. Non-Final Office Action cited in U.S. Appl. No. 12/127,968 mailed Mar. 31, 2010.
U.S. Final Office Action cited in U.S. Appl. No. 12/127,968 mailed Dec. 1, 2009.
U.S. Non-Final Office Action cited in U.S. Appl. No. 12/127,968 mailed Apr. 30, 2009.
U.S. Non-Final Office Action cited in U.S. Appl. No. 12/179,752 mailed Dec. 23, 2009.
U.S. Non-Final Office Action cited in U.S. Appl. No. 12/179,763 mailed Jan. 4, 2011, 18 pages.
U.S. Final Office Action cited in U.S. Appl. No. 12/179,767 mailed Aug. 20, 2010.
U.S. Non-Final Office Action cited in U.S. Appl. No. 12/179,767 mailed Jan. 22, 2010.
U.S. Non-Final Office Action cited in U.S. Appl. No. 12/180,416 mailed Jun. 25, 2010.
U.S. Final Office Action cited in U.S. Appl. No. 12/372,887 mailed Apr. 14, 2010.
U.S. Non-Final Office Action cited in U.S. Appl. No. 12/372,887 mailed Oct. 16, 2009.
U.S. Non-Final Office Action cited in U.S. Appl. No. 12/372,894 mailed Oct. 27, 2009.
U.S. Final Office Action cited in U.S. Appl. No. 12/372,917 mailed May 17, 2010.
U.S. Non-Final Office Action cited in U.S. Appl. No. 12/372,917 mailed Oct. 26, 2009.
U.S. Non-Final Office Action cited in U.S. Appl. No. 12/388,002 mailed Sep. 3, 2010.
U.S. Final Office Action cited in U.S. Appl. No. 12/388,139 mailed Jul. 6, 2010.
U.S. Non-Final Office Action cited in U.S. Appl. No. 12/388,139 mailed Dec. 15, 2009.
U.S. Final Office Action cited in U.S. Appl. No. 12/389,128 mailed Nov. 9, 2010, 50 pages.
U.S. Non-Final Office Action cited in U.S. Appl. No. 12/389,128 mailed Jun. 2, 2010.
U.S. Non-Final Office Action cited in U.S. Appl. No. 12/389,564 mailed Jan. 21, 2011, 13 pages.
U.S. Non-Final Office Action cited in U.S. Appl. No. 12/389,564 mailed Aug. 23, 2010.

U.S. Final Office Action cited in U.S. Appl. No. 12/389,564 mailed Apr. 28, 2010.
U.S. Non-Final Office Action cited in U.S. Appl. No. 12/389,564 mailed Nov. 10, 2009.
U.S. Non-Final Office Action cited in U.S. Appl. No. 12/390,418 mailed Sep. 28, 2010, 13 pages.
U.S. Non-Final Office Action cited in U.S. Appl. No. 12/390,420 mailed Oct. 19, 2010, 12 pages.
U.S. Non-Final Office Action cited in U.S. Appl. No. 12/390,422 mailed Oct. 20, 2010, 13 pages.
U.S. Non-Final Office Action cited in U.S. Appl. No. 12/413,686 mailed Mar. 17, 2011, 20 pages.
U.S. Final Office Action cited in U.S. Appl. No. 12/413,686 mailed Jun. 10, 2010.
U.S. Non-Final Office Action cited in U.S. Appl. No. 12/413,686 mailed Nov. 30, 2009.
U.S. Non-Final Office Action cited in U.S. Appl. No. 10/761,777 mailed Apr. 12, 2011, 20 pages.
U.S. Non-Final Office Action cited in U.S. Appl. No. 10/934,253 mailed Apr. 29, 2011, 11 pages.
U.S. Final Office Action cited in U.S. Appl. No. 12/389,564 mailed May 19, 2011, 15 pages.
U.S. Non-Final Office Action cited in U.S. Appl. No. 10/740,138 mailed Jun. 8, 2011, 26 pages.
U.S. Final Office Action cited in U.S. Appl. No. 11/170,348 mailed Jun. 9, 2011, 14 pages.
U.S. Final Office Action mailed Jul. 19, 2011 in U.S. Appl. No. 11/162,345.
Board of Patent Appeals and Interferences Decision mailed Aug. 8, 2011 in U.S. Appl. No. 09/518,041.
U.S. Non-Final Office Actoin mailed Sep. 6, 2011 in U.S. Appl. No. 11/238,369.
U.S Non-Final Office Action mailed Sep. 13, 2011 in U.S. Appl. No. 12/389,564.
U.S. Non-Final Office Action mailed Sep. 27, 2011 in U.S. Appl. No. 12/413,686.
U.S. Final Office Action mailed Nov. 10, 2011 in U.S. Appl. No. 10/934,253.
U.S. Final Office Action mailed Jan. 24, 2012 in U.S. Appl. No. 11/238,369.
U.S. Final Office Action mailed Apr. 16, 2012 in U.S. Appl. No. 12/413,686.
U.S. Final Office Action mailed May 14, 2012 in U.S. Appl. No. 11/238,369.
U.S. Non-Final Office Action mailed May 30, 2012 in U.S. Appl. No. 10/740,138.
U.S. Appl. No. 09/330,792, filed Jun. 11, 1999 entitled "Series Reminders and Series Recording from an Interactive Television program Guide".
U.S. Appl. No. 09/378,533, filed Aug. 20, 1999 entitled "Electronic Program Guide with Advance Notification".
U.S. Appl. No. 09/518,041, filed Mar. 2, 2000 entitled "Apparatus and Method for Providing a Plurality of Interactive Program Guide Initial Arrangements".
U.S. Appl. No. 09/591,356, filed Jun. 9, 2000 entitled "Future Program Options Menu System for Interactive Program Guide".
U.S. Appl. No. 09/692,920, filed Oct. 20, 2000 entitled "Media-on-Demand Title Indexing System".
U.S. Appl. No. 09/692,995, filed Oct. 20, 2000 entitled "Media-on-Demand Bookmark System".
U.S. Appl. No. 09/693,115, filed Oct. 20, 2000 entitled "Media Services Window Configuration System".
U.S. Appl. No. No. 09/693,288, filed Oct. 20, 2000 entitled "Media-on-Demand Rental Duration Management System".
U.S. Restriction Requirement cited in U.S. Appl. No. 11/162,345 mailed Jul. 3, 2008.
VESA Plug and Display Standard, Version 1, Video Electronics Standards Association, XP-002123075, 90 pages (Jun. 11, 1997).
W3C, Putting language attributes in HTML, www.w3.org.org/International/O-help-lang, 2 pages (Apr. 29, 1997).

* cited by examiner

INTEGRATED SEARCHING SYSTEM FOR INTERACTIVE MEDIA GUIDE

CROSS-REFERENCE TO RELATED APPLICATIONS

This application is a continuation-in-part of application Ser. No. 09/590,904, filed on Jun. 9, 2000 U.S. Pat. No. 8,079,047, which is entirely incorporated herein by reference.

FIELD OF THE INVENTION

This invention relates in general to television systems, and more particularly, to the field of interactive guides.

BACKGROUND OF THE INVENTION

With recent advances in digital transmission technology, cable television systems are now capable of providing much more than the traditional analog broadcast video. In implementing enhanced programming, the home communication terminal ("HCT"), otherwise known as the settop box, has become an important computing device for accessing media services and navigating a user through a maze of available services. In addition to supporting traditional analog broadcast video functionality, digital HCTs (or "DHCTs") now also support an increasing number of two-way digital services such as video-on-demand.

Typically, a DHCT is connected to a cable or satellite television network and includes hardware and software necessary to provide the functionality of the digital television system at the client's site. Preferably, some of the software executed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

As more and more services and applications are provided, cable television systems are providing media information to the DHCT so that the user can view the media information on the DHCT display such as the television. This media information has traditionally been organized for presentation purposes into a media guide format that presents the media information by time and channel only. The media guide can, for instance, automatically scroll the available television channels to present the media information such as name and title, by time.

Many cable system operators include one or more dedicated channels that scroll through the channel list displaying the programs that not only are currently on, but also are scheduled to be on in the future. These types of passive displays do not rely on a terminal for presentation of the programming data and also lack the interactive functionality of permitting a user to scroll to a desired channel for a desired time. For example, the user typically must view the programming information as it scrolls on the display and wait for either the desired channel and/or the desired time to search for the media that may be available for viewing.

With the advent of program guide "browsers" for use in cable television systems, viewers (also referred to as "subscribers" or "users") can scan television program information by time and channel while watching the tuned channel. In analog systems that offer a limited number of cable television channels, these browsers enable the viewer to easily scan available programs one-by-one in order of channel number. However, many digital systems can provide hundreds of channels as well as thousands of video-on-demand (VOD) movies. In such systems, scanning program information by channel numbers sequentially or by video titles alphabetically can require many keystrokes by the viewer and can consume tremendous amounts of time. Additionally, locating a particular program can be quite tedious if the viewer does not already know the name or number of the channel on which the program will be showing or whether the program is available as a video-on-demand option. As a result, there is a need for an interactive media guide that enables viewers to easily and efficiently locate media information that they are seeking.

SUMMARY OF THE INVENTION

The invention may be viewed as a system for providing media services to a user via an interactive media services client device coupled to a programmable media services server device. A method of the preferred embodiment of the invention includes receiving user input, searching media information stored in memory, and providing the user with a search result that is related to user input.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts or screen areas throughout the several views.

DETAILED DESCRIPTION OF THE PREFERRED EMBODIMENTS

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
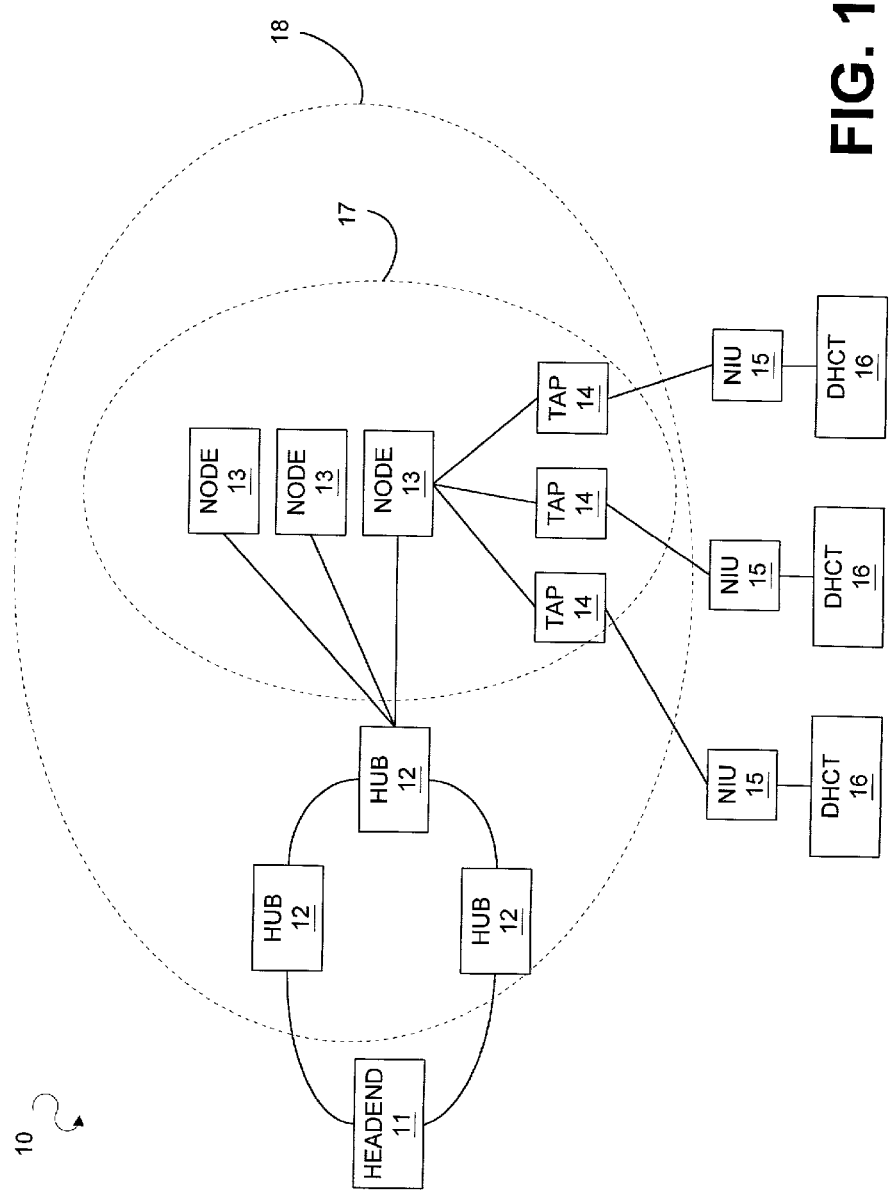
FIG. 1 is a block diagram of a cable television system in accordance with one preferred embodiment of the present invention.

The present invention is generally implemented as part of a cable television system (CTS). Hence, an illustrative CTS 10 and its operation will be described initially. FIG. 1 shows a block diagram view of a CTS 10, which is generally a high quality, reliable and integrated network system that features video, audio, voice and data services to DHCT users. Although FIG. 1 depicts a high level view of a CTS 10, it should be appreciated that a plurality of cable television systems can tie together a plurality of regional networks into an integrated global network so that DHCT users can receive content provided from anywhere in the world.

The CTS 10 delivers broadcast video signals as digitally formatted signals in addition to delivering traditional broadcast analog video signals. Furthermore, the system can support one way broadcast services as well as both one-way data services and two-way media and data services. The two-way operation of the network allows for user interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as Internet connections and interactive media Guide (IMG) applications.

The CTS 10 also provides the interfaces, network control, transport control, session control, and servers to access content and services, and distributes content and services to DHCT users. As shown in FIG. 1, a typical CTS 10 comprises a headend 11, hubs 12, an HFC access network 17, and users' digital home communication terminals (DHCTs) 16. It should be appreciated that although a single component (e.g. a headend) is illustrated in FIG. 1, a CTS 10 can feature a plurality of any one of the illustrated components or may be configured with alternative embodiments for any one of the individual components or with yet other additional components not enumerated above. A content provider (not shown) transmits media content to a headend for further transmission to users downstream in the network.

Content provided by a content provider is communicated by the content provider to one or more headends 11. From those headends the content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which is connected to a network interface unit (NIU) 15 which is connected to a DHCT 16. The NIU 15 is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers.

As the high-level operations of many of the functions of CTSs 10 are well known to those of skill in the art, further description of the overall CTS 10 of FIG. 1 will not be contained herein. It will be appreciated, however, that the CTS 10 shown in FIG. 1 is merely illustrative and should not be construed as implying any limitations upon the scope of the present invention.

Figure 2:
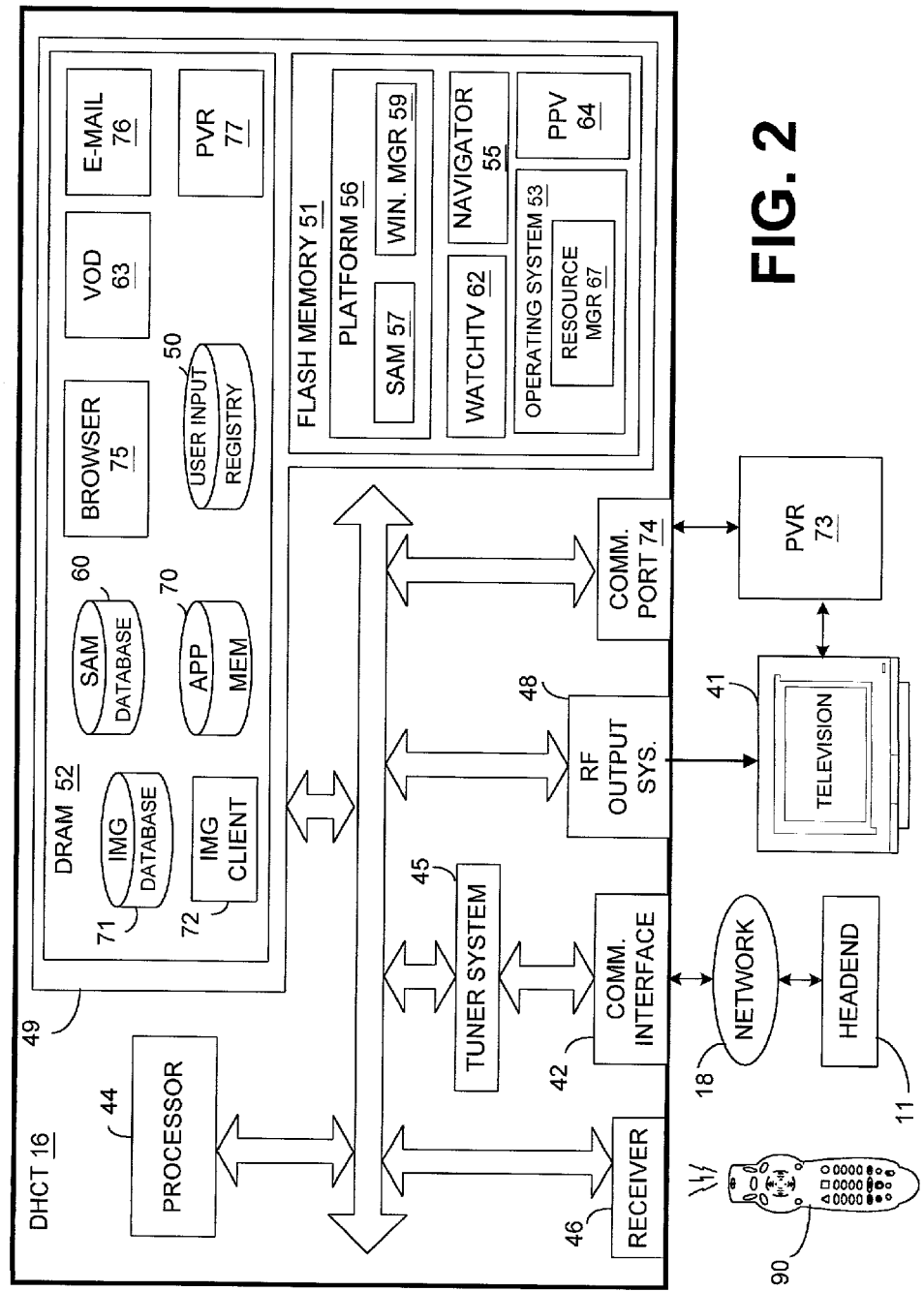
FIG. 2 is a block diagram of the DHCT depicted in FIG. 1 and related equipment, in accordance with one embodiment of the present invention.

FIG. 2 is a block diagram illustrating a DHCT 16 (also referred to as an interactive media services client device) that is coupled to a headend 11, to a personal video recorder (PVR) 73, and to a television 41. A DHCT 16 is typically situated at a user's residence or place of business and may be a stand alone unit or integrated into another device such as, for example, a television set, a video recorder, or a personal computer. The DHCT 16 preferably includes a communications interface 42 for receiving RF signals, which can include video, audio and/or information data, from the headend 11 through the network 18 and for providing any reverse information to the headend 11 through the network 18.

The DHCT 16 further includes a processor 44 for controlling operations of the DHCT 16, an RF output system 48 for driving the television display 41, and a tuner system 45 for tuning into a particular television channel to be displayed and for sending and receiving various types of data from the headend 11. The tuner system 45 includes, in one implementation, an out-of-band tuner for bi-directional quadrature phase shift keying (QPSK) data communication and a quadrature amplitude modulation (QAM) tuner for receiving television signals.

The DHCT 16 is coupled to a personal video recorder (PVR) 73 via a communications port 74 and possibly via video and audio output ports of DHCT 16 connected to video and audio input ports of PVR 73 and/or video and audio output ports of PVR 73 connected to video and audio input ports of DHCT 16, as shown by the bi-directional horizontal arrow in FIG. 2. A personal video recorder (PVR) is a video recorder for recording media presentations, preferably via a digital recording mechanism. In an alternative embodiment, PVR functionality is integrated into the DHCT 16 or vice versa. In another alternate embodiment, multiple PVR units are connected to DHCT 16, one or more housed internal to DHCT 16 and one or more connected externally to DHCT 16 via one or more communication ports such as communication port 74.

PVR 73 comprises a local storage device (not shown) in which media can be written to and stored and later read from and retrieved for viewing or playing. The storage device can be a device such as a hard drive storage device based on magnetism principles or a compact disc readable and writeable device based on optical or laser technology principles.

The interactive media guide (IMG) client application 72 stores information in the IMG database 71 regarding media presentations that are currently available via the DHCT 16 or the personal video recorder 73. A receiver 46 receives externally-generated information, such as user inputs or commands from other devices. The user inputs may, for example, be provided via a remote control device 90, an infrared (IR) or wired keyboard (not shown), keys in the front panel of DHCT 16, or some other input device (not shown).

In one implementation, the DHCT 16 includes system memory 49, which includes flash memory 51 and dynamic random access memory (DRAM) 52, for storing various applications, modules and data for execution and use by the processor 44 of the DHCT 16. Both the flash memory 51 and the DRAM memory 52 are coupled to the processor 44 for storing configuration data and operational parameters, such as commands that are recognized by the processor 44. Basic functionality of the DHCT 16 is provided by an operating system 53 that is contained in flash memory 51. Among other things, the operating system 53 includes at least one resource manager 67 that provides an interface to resources of the DHCT 16 such as, for example, computing resources.

One or more programmed software applications, herein referred to as applications, are executed by utilizing the computing resources in the DHCT 16. The application executable program stored in flash memory 51 or DRAM memory 52 is executed by processor 44 (e.g., a central processing unit or digital signal processor) under the auspices of the operating system 53. Data required as input by the application program is stored in DRAM memory 52 or flash memory 51 and read by processor 44 as need be during the course of application program execution. Input data may be data stored in DRAM memory 52 by a secondary application or other source, either internal or external to the DHCT 16, or possibly anticipated by the application and thus created with the application program at the time it was generated as a software application program, in which case it is stored in flash memory 51. Data may be received via any of the communication ports of the DHCT 16, from the headend 11 via the DHCT's network communication interface 42 (i.e., the QAM or out-of-band tuners) or as user input via receiver 46. A type of input data fulfills and serves the purpose of parameters. Data generated by application program is stored in DRAM memory 52 by processor 44 during the course of application program execution.

An application referred to as navigator 55 is also resident in flash memory 51 for providing a navigation framework for services provided by the DHCT 16. The navigator 55 registers for and in some cases reserves certain user inputs related to navigational keys such as channel increment/decrement, last channel, favorite channel, etc. The applications may be resident in flash memory 51 or downloaded into DRAM 52. The navigator 55 also provides users with television related menu options that correspond to DHCT functions such as, for example, setting a program record operation to be effected with a personal video recorder (73), enabling a special access program (SAP), setting a sleep timer, adding a channel to a favorites list, providing an interactive media guide, blocking a channel or a group of channels from being displayed in a browse-by menu, activating parental control, and displaying a video-on-demand titles list etc. Some of the functionality performed by applications executed in the DHCT 16 (such as the VOD application 63) may instead be performed at the headend 11 and vice versa.

The flash memory 51 also contains a platform library 56. The platform library 56 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 56 that are shown in FIG. 2 are a window manager 59 and a client service application manager (SAM) 57.

The window manager 59 provides a mechanism for implementing the sharing of the screen regions and user input. The window manager 59 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 59 also maintains, among other things, a user input registry 50 in DRAM 52 so that when a user enters a key or a command via the remote control device 90 or another input device such as a keyboard or mouse, the user input registry 50 is accessed to determine which of various applications running on the DHCT 16 should receive data corresponding to the input key and in which order. As an application is executed, it registers a request to receive certain user input keys or commands. When the user presses a key corresponding to one of the commands on the remote control device 90, the command is received by the receiver 46 and relayed to the processor 44. The processor 44 dispatches the event to the operating system 53 where it is forwarded to the window manager 59 which ultimately accesses the user input registry 50 and routes data corresponding to the incoming command to the appropriate application.

The Client SAM 57 is a client component of a client-server pair of components, with the server component being located on the headend 11. A SAM database 60 in DRAM 52 includes a data structure of media services and a data structure of channels that are created and updated by the headend 11. Many media services can be defined using the same application component, with different parameters. Examples of media services include, without limitation and in accordance with one implementation, presenting television programs (via a WATCHTV application 62), pay-per-view (PPV) events (via a PPV application 64), video-on-demand (via a VOD application 63), and media information gathering and display (via an IMG application 72). The term "media" is herein defined to include television programs, PPV events, VOD programs, graphical and textual based programs, and any other video and/or audio presentation or combinations thereof. In general, the identification of a media service includes the identification of an executable application that effects the media service and also includes a set of application-dependent parameters that indicate to the application the specific media service to be provided. As a non-limiting example, a service of presenting a television program could be executed with the WATCHTV 62 application with a set of parameters to view HBO or with a separate set of parameters to view CNN. Each association of the application component (tune video) and one parameter component (HBO or CNN) represents a particular service that has a unique service I.D. The Client SAM 57 also interfaces with the resource manager 67, as discussed below, to control resources of the DHCT 16.

Application clients can also be downloaded into DRAM 52 at the request of the Client SAM 57, typically in response to a request by the user or in response to a message from the headend. In this non-limiting example DRAM 52 contains a VOD application 63, an e-mail application 76, an IMG application 72, and a web browser application 75. It should be clear to one with ordinary skill in the art that these applications are not limiting and merely serve as examples for this present embodiment of the invention. Furthermore, one or more DRAM based applications may, as an alternative embodiment, be resident in flash memory 51 or vice versa. These applications, and others provided by the cable system operator, are top level software entities on the network for providing media services to the user.

In one implementation, applications executing on the DHCT 16 work with the navigator 55 by abiding by several guidelines. First, an application utilizes the Client SAM 57 for the provision, activation, and suspension of services. Second, an application shares DHCT 16 resources with other applications and abides by the resource management policies of the Client SAM 57, the operating system 53, and the DHCT 16. Third, an application handles situations where resources are unavailable without navigator 55 intervention. Fourth, when an application loses service authorization while providing a service, the application suspends the service via the SAM (the navigator 55 will reactivate an individual service application when it later becomes authorized). Finally, an application client is designed to not have access to certain user input keys reserved by the navigator (i.e., power, channel +/−, volume +/−, etc.). DRAM 52 also includes application memory 70 that various applications may use for storing and retrieving data.

The IMG client application 72 provides the user with a displayed presentation of media information that the IMG client application 72 retrieves from an IMG database 71 and/or from a remote application server via communication with such remote application server via communication interface 42. The media information includes the titles of media presentations, information identifying their respective service type (VOD, NVOD PPV, PVR, cable channel, or broadcast channel), the times that the media presentations will be available (if applicable) or the time a media program was recorded in PVR 73 with an expiration time for when the recorded program will be erased from PVR device. The media information also includes the channel numbers on which the respective media presentations will be available (if applicable) or PVR instead of channel with the channel in which it was received into DHCT 16 and recorded in parentheses next after PVR. Alternatively, a representative icon can be displayed to the user that signifies a recorded program.

The media information can further include duration of media programs, quality of media programs such as digital standard format, digital high-definition format, or analog format, the level of random access featured in the respective media programs, the levels of program copy or record entitlement, the cost associated with the respective media programs, and requirements to receive the respective media programs.

Any specific media information field can be visually communicated to the user with the employment of icons that denote corresponding meaning. For instance, the quality of media program can be displayed with an HD icon, SD icon, or an A icon. The level of random access can be denoted also with icons such as a "<<||>>" to denote full random access as available in most VOD services and from recorded media, by "||>" for pause and resume as available in Near Video-on-Demand (NVOD)service, or by a circle with a diameter bar or NA icon for no random access level as in the case of PPV or regular broadcast media. Likewise, other media information types such as the level of copying or recording entitlement, cost, and requirements can be communicated with icons to the user.

Levels of random access in the media information include the right to pause, stop, resume play, rewind and fast-forward the media program on a real-time basis. Levels of program copying or recording entitlement include whether the media program can be recorded at all, whether the media program is a previously recorded media program, and the quality at which the media program can be recorded as reflected by maximum bit rate and video and audio compression format.

Requirement information for receiving a media program includes TV type information such as an HDTV set or merely an NTSC analog TV, type of audio playback system, and/or subscription service requirement. As an example of a subscription service, a media program may be broadcast by a premium channel such as HBO and requires subscription to receive the HBO channel.

In one embodiment the IMG client application 72 stores relevant media information in the IMG database 71. The IMG database 71 may be a prepared database received via communication interface 42 of DHCT 16 from an IMG server counterpart at the headend 11 or some other remote location. In an alternative embodiment, other media applications (such as VOD application 63, PPV application 64, PVR application 77, and WATCHTV application 62) are responsible for storing relevant media information in the IMG database 71. In yet another embodiment, relevant media information is stored and retrieved from application memory 70 by the IMG application 72 by conducting search operations in the respective databases of the aforementioned applications. Furthermore, if an electronic program guide (EPG) application and respective database exist, the EPG database application stores relevant information in IMG database 71, otherwise IMG client application 72 would conduct search operations in the EPG database as well. The present invention is not limited by where or how the media information is stored or retrieved.

The IMG database 71 is structured with records, each record comprising multiple fields, each field containing data for a respective attribute of the record. A field may comprise a subrecord of multiple field entities. For example, the record for media information for a movie entitled "Election," may contain a title field, and multiple subrecords, each subrecord comprises each instance of Election that the user can view. Hence, each subrecord may comprise fields for: service type attribute, channel number, quality attribute, a field to store level of random access attribute, a field to store level of copy/record attribute, etc. In one alternate embodiment, the IMG database 71 or parts thereof may reside in the storage device in PVR 73. Consequently, IMG client application 72 writes data to PVR 73 to store media information and reads data from PVR 73 to retrieve media information as necessary.

An executable program or algorithm corresponding to an operating system (OS) component, or to a client platform component, or to a client application, or to respective parts thereof, can reside in and execute out of DRAM 52 and/or flash memory 51. Likewise, data inputted into or outputted from any executable program can reside in DRAM 52 or flash memory 51. Furthermore, an executable program or algorithm corresponding to an OS component, or to a client platform component, or to a client application, or to respective parts thereof, can reside in flash memory 51, or in a local storage device connected to DHCT 16 and can be transferred into DRAM 52 for execution. Likewise, data input for an executable program can reside in flash memory 51 or a storage device and can be transferred into DRAM 52 for use by an executable program or algorithm. In addition, data outputted by an executable program can be written into DRAM 52 by an executable program or algorithm and can be transferred into flash memory 51 or into a storage device for storage purposes. The present invention is not limited by where or how data and/or applications are stored or retrieved.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 3:
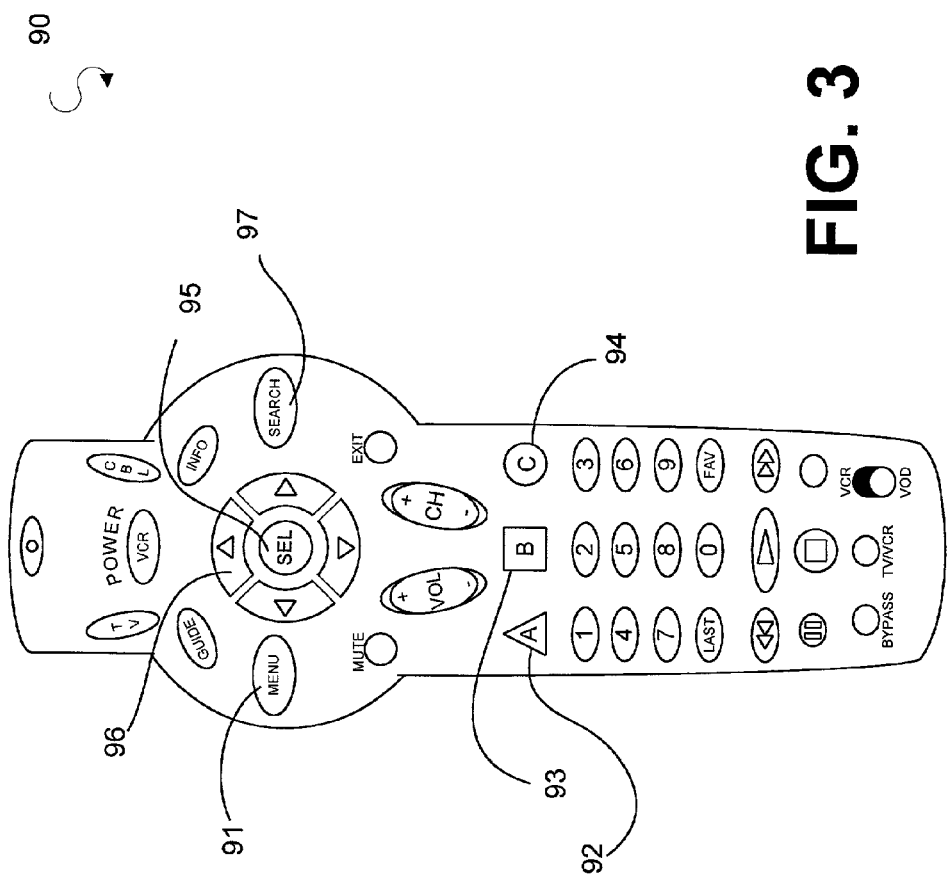
FIG. 3 depicts an example remote control device that is used to provide user input to the DHCT depicted in FIG. 2.

FIG. 3 illustrates a non limiting example of a remote control device 90 that is used to provide user input to the DHCT 16. The remote control device 90 includes arrow buttons (such as arrow button 96) that are activated by a user to scroll through media information or to designate an option as the highlighted option. The select button 95 may be used to select a currently highlighted option or media title that is provided to the user. Other buttons that are available on the remote control device 90 will be discussed further below. Many alternative methods of providing user input might be used including a remote control device with different buttons and/or button layouts, a keyboard device, a voice activated device, etc. The invention described herein is not limited by the type of device used to provide user input.

Figure 4:
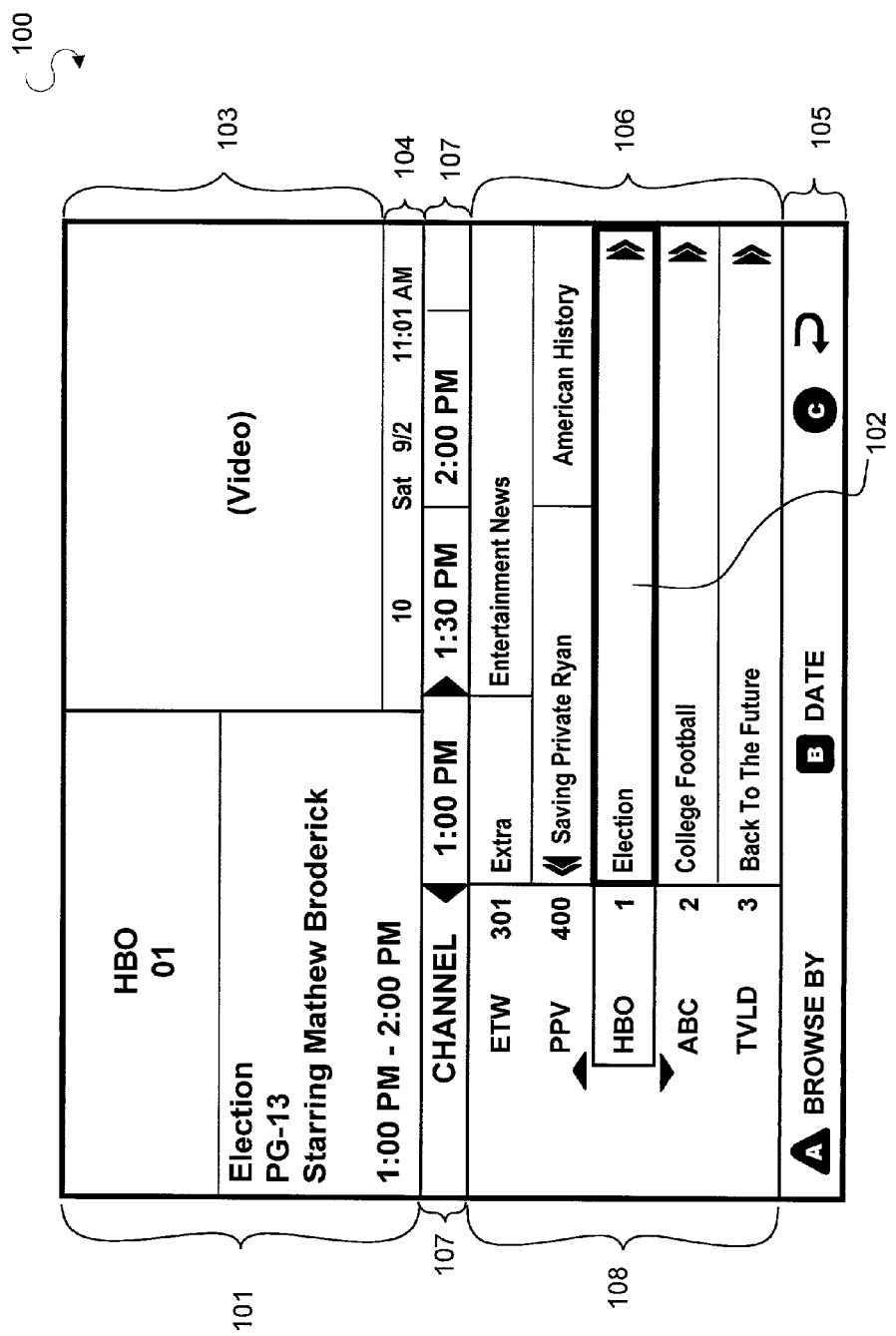
FIG. 4 depicts an example screen diagram that illustrates an initial guide arrangement in a time format that the DHCT as depicted in FIG. 2 presents the user.

With continued reference to FIGS. 2 & 3 throughout the remaining figures, FIG. 4 depicts an example interactive media guide screen 100 that illustrates an initial guide arrangement in a time format. As with other window examples discussed below, processor 44 executes program instructions of MOD client application 63 that cause it to direct the window manager 59 to create window 100 via display data that is formatted for television 41. Processor 44 stores the display data or parts thereof in DRAM 52 (as necessary) and transfers the display data to a display output system such as RF output system 48 wherein display data is converted to respective television signals and transmitted to television 41. Of course, the scope of the invention also includes any other method of causing the described windows to appear to the user.

The top left portion of the example screen 100 is a detailed focus area 101 that includes detailed channel information (channel number, channel name (HBO), media name, media description, duration, any episode information or rating, etc.) for an "in-focus" media corresponding to highlighted title area 102 in a main media title display area 106. The media presentation showing on the channel to which the DHCT 16 is currently tuned (for which audio is also playing, and which is typically the media occupying the full screen before the IMG client application 72 is activated) is displayed in a reduced screen area 103 in example screen 100. Immediately below the reduced screen area 103 is an information banner 104 showing the channel to which the DHCT 16 is currently tuned, the current day and date, and the current time. The middle left portion of example screen 100 includes a channel area 108 that is related to the selected ordering format and is described in more detail below. Heading portion 107 contains headings related to the information displayed in the channel area 108 and the main media title display area 106. The main media title display area 106 contains media titles corresponding to media presentations that are or will be available for viewing during the time periods listed under the heading portion 107. The highlighted title area 102 is centered in the main media title display area 106 enabling the user to scroll up and down to the various media titles listed in the main media title display area 106.

The main media title display area 106 includes media names organized in a grid of rows of channels and columns of time. The channel area 108 includes a vertical list of channels organized sequentially by channel number. The main media title display area 106 can be scrolled in both time and channel number dimensions. The time dimensions are a horizontal array of media names categorized in columns of times in which they are broadcast.

In this non-limiting example, the lowest channel in this channel list displayed in the channel area 108 is HBO which is shown as channel 1. Continuing with this non-limiting example, the left-most time column in the main media title display area 106 is set to include titles of media presentations scheduled to be broadcast about two hours into the future with the middle title being "in-focus" and corresponding to a media presentation on the lowest channel. Therefore, in this example, the movie "Election" which is on channel 1, is centered in the highlighted title area 102. It should be noted that the current media presentation shown in reduced screen area 103 and referenced in information banner 104, corresponds to a different channel (which in this example is channel 10) and not to the in-focus media on channel 1. The bottom area 105 of example screen 100 indicates options for the "A" 92, "B" 93, and "C" 94 buttons on the remote control device 90. The "A" button 92 is shown assigned to invoke a "Browse-by" menu which would function as discussed below. The "B" button 93 enables the user to select a different date for viewing or searching media data via example screen 100. Operation of the "C" button 94 results in the display of media titles in the main media title display area 106 which correspond to media presentations that are or will be playing during a time period that includes the current time, with the media title currently on the channel to which the DHCT is tuned highlighted and displayed in the "in focus" area 102 The times listed the heading portion 107 are updated accordingly.

Figure 5:
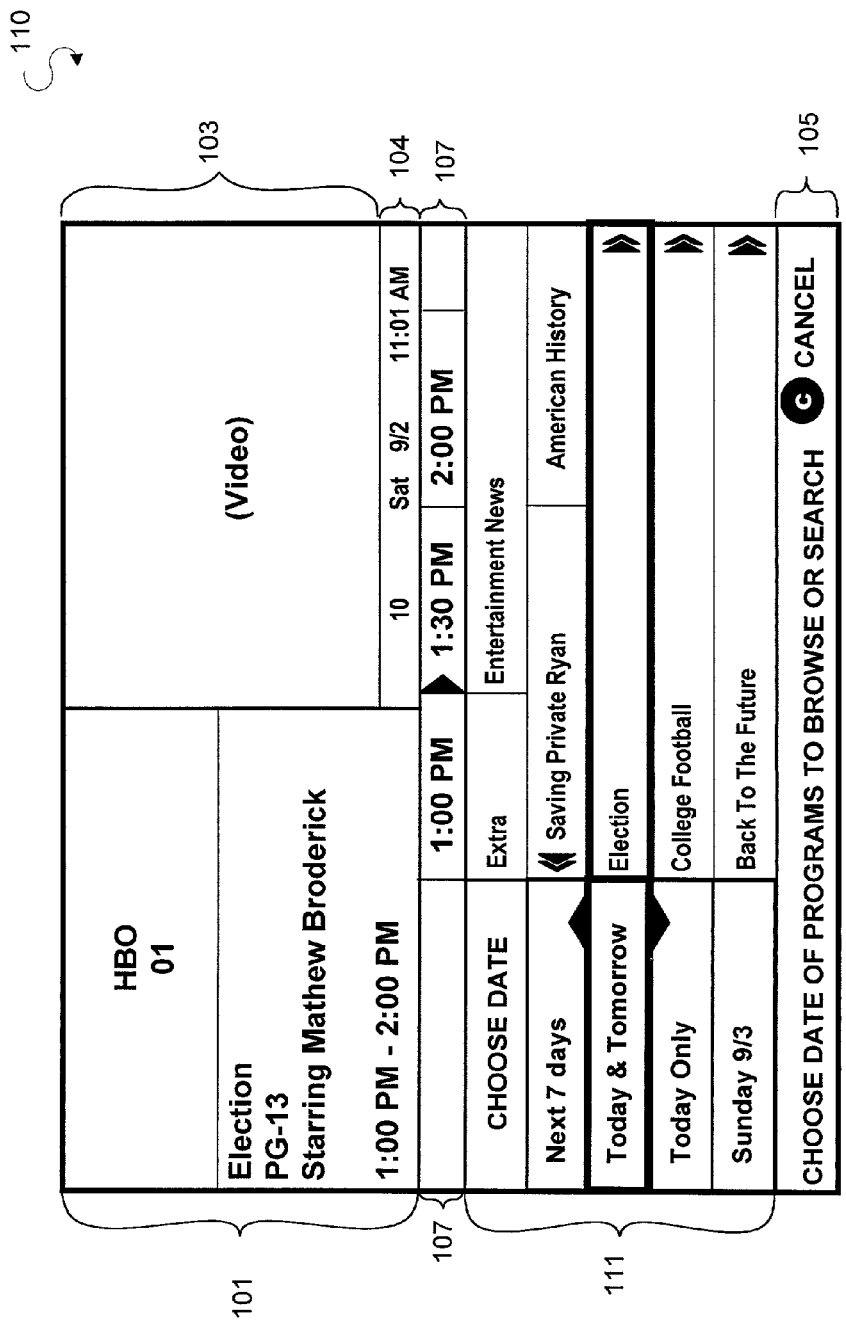
FIG. 5 depicts an example screen diagram that illustrates a guide arrangement containing selectable time periods that the DHCT as depicted in FIG. 2 presents to the user.

FIG. 5 depicts an example time period selection screen illustrating a guide arrangement that is displayed following the activation of the "B" button 93 on the remote control device 90 while the initial guide arrangement 100 illustrated in FIG. 4 is being presented to a user. A list of time periods is displayed in an input portion 111 with the default in-focus time period being "Today & Tomorrow". Example screen 110 enables a user to select a time period that corresponds to the media information that the user is interested in viewing or searching. In this non-limiting example, if a user wants to view or search media information for a time period other than the initially highlighted period, the remote control device 90 may be used to select an alternative time period that is listed in the input portion 111. In accordance with the preferred embodiment of the present invention, single dates and ranges of dates are available, including actual dates, e.g., "Sunday ⅔", as well as relative dates, "Next 7 Days", "Today and Tomorrow", "Today Only" etc. Of course, other selections are available in other embodiments of the present invention. After a time period in input area 111 is selected, the search engine sub-component (not shown) of IMG client application 72 performs a search operation on IMG database 71 utilizing the information entered by the user. Search efficiency is facilitated by structuring database into fields that can be indexed into with individual search categories guiding the search engine to particular fields of the records in the database. The search operation produces data retrieved from IMG database 71 that comprises a subset of media information satisfying the search criteria entered by the user. IMG client application 72 stores the result of the search in a separate section of application memory. Media information conforming to the user's search criteria, in this non-limiting example, corresponding to the selected time period, is subsequently presented by the IMG client application 72 to the user by causing the information to be displayed via television 41 through RF output system 48. Example screen 100 (FIG. 4) is presented to the user in place of example screen 110 either after a time period selection is made or after the user activates the "C" button 94 on the remote control device 90. The search engine sub-component of IMG client application 72 thus has the capability to search database records by user-input criteria that gears the search engine's operation to focus on particular fields of the database's records.

Figure 6:
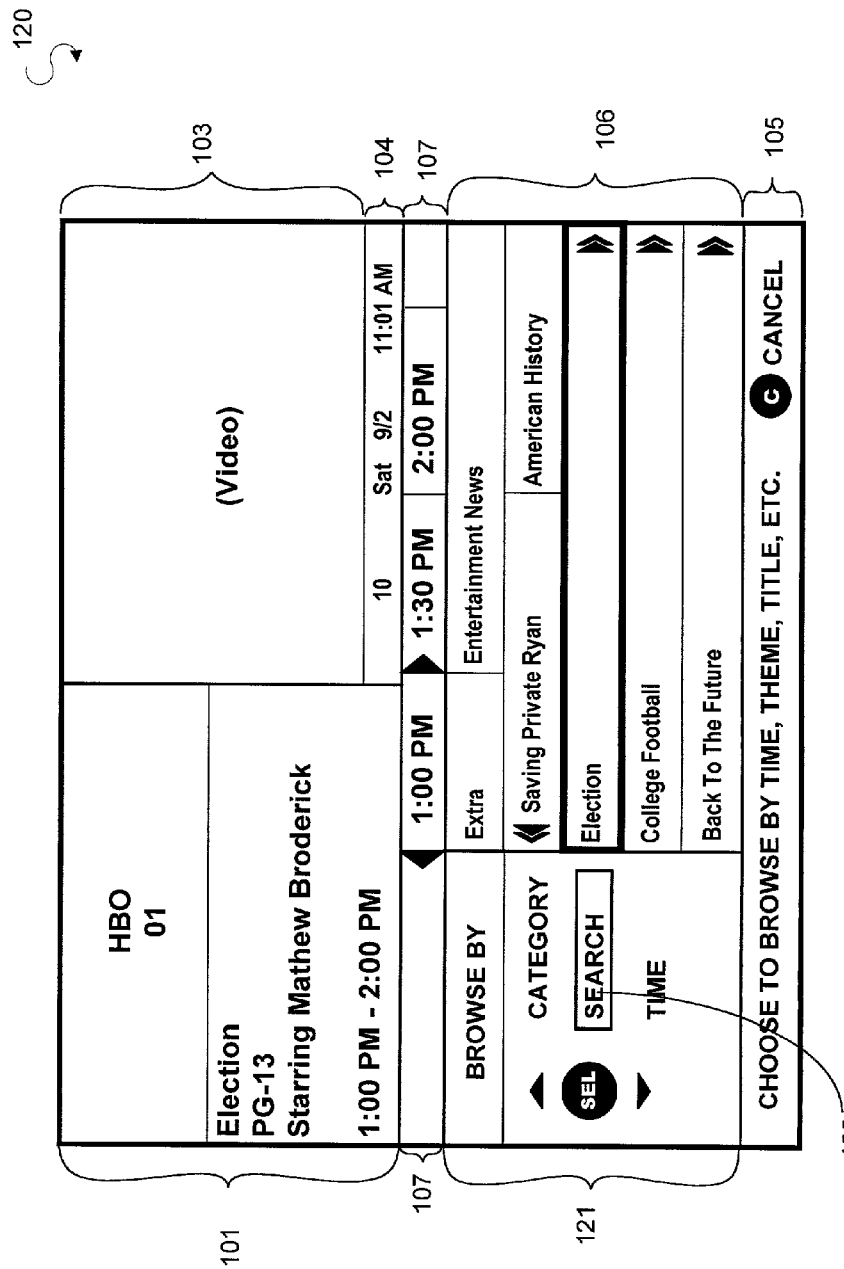
FIG. 6 depicts an example screen diagram that illustrates a guide arrangement with a browse-by menu.

FIG. 6 depicts an example browse-by screen 120 illustrating a guide arrangement in a browse-by format that is presented to a user after the user activates the "A" button 92 on the remote control device 90. In addition to presenting media information in a format based on time and channel number, the IMG client application 72 may be configured to present a guide arrangement in a format that limits the media information presented to information that corresponds to media titles containing a specific word or character sequence as specified through user input. By selecting the in-focus selection "SEARCH" 122 in the browse-by area 121 a user is presented with a guide arrangement in a search format as depicted in example screen 130 in FIG. 7.

Figure 7:
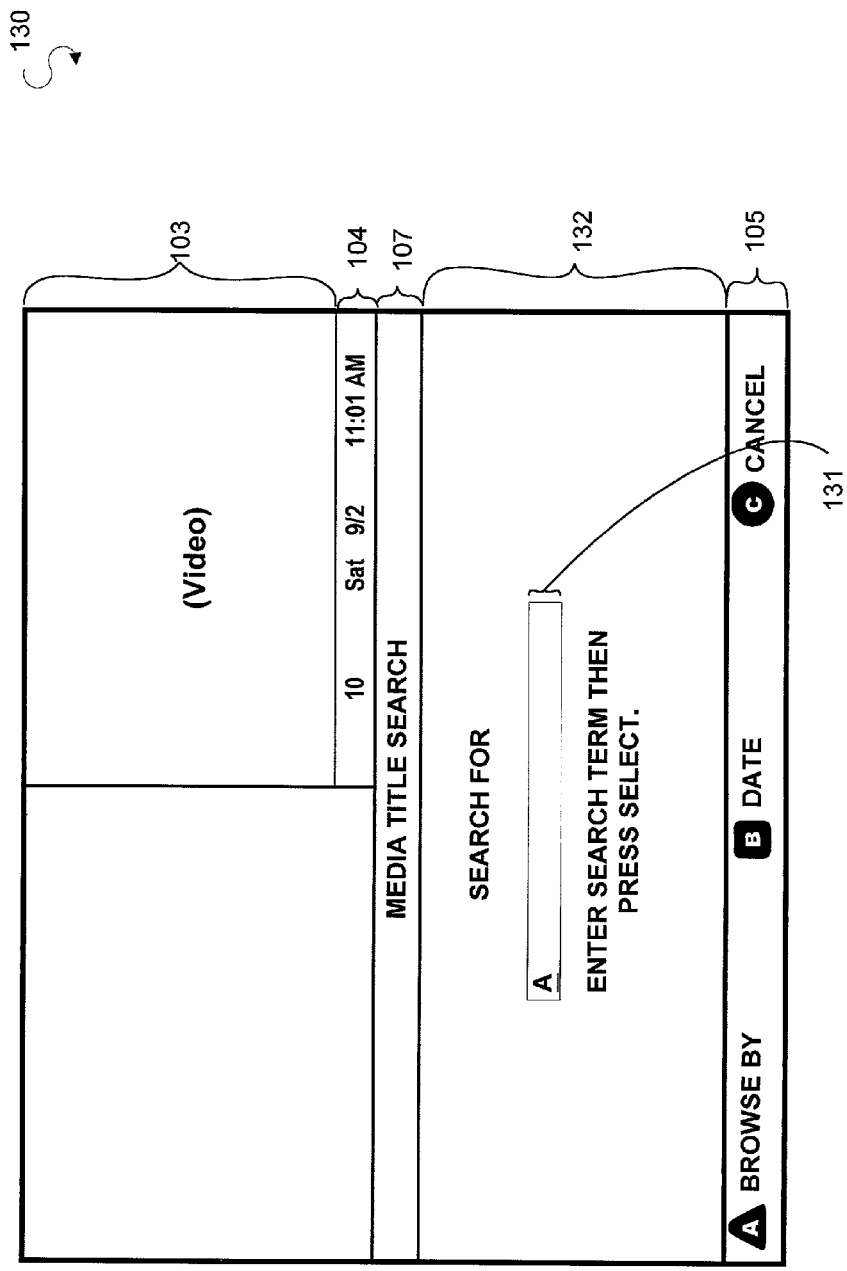
FIG. 7 depicts an example screen diagram that illustrates a guide arrangement used for displaying a search term that is received by the DHCT as depicted in FIG. 2.

FIG. 7 depicts an example search screen 130 illustrating a guide arrangement in a search format that is presented to a user after the user selects the search option 122 via example screen 120. In this non-limiting example, the user is presented with an input field 131 in the input portion 132 of the search screen 130. The user may use a remote control device 90 to scroll through and select characters in order to construct a search term that the IMG application 72 will incorporate into the input field 131. UP/DOWN buttons on a remote control device 90 would cause a cursor in the input field 131 to scroll through all available search characters (A-Z, 0-9), and LEFT/RIGHT buttons would enable the user to proceed to the next or previous character in a desired search string. In other embodiments, the screen would also include characters above and below the input field 131 showing one or more preceding and/or succeeding characters. Available characters include any alpha-numeric character used in the data to be searched. In addition, the user may utilize a keyboard (not shown) for specifying the search term.

Figure 8:
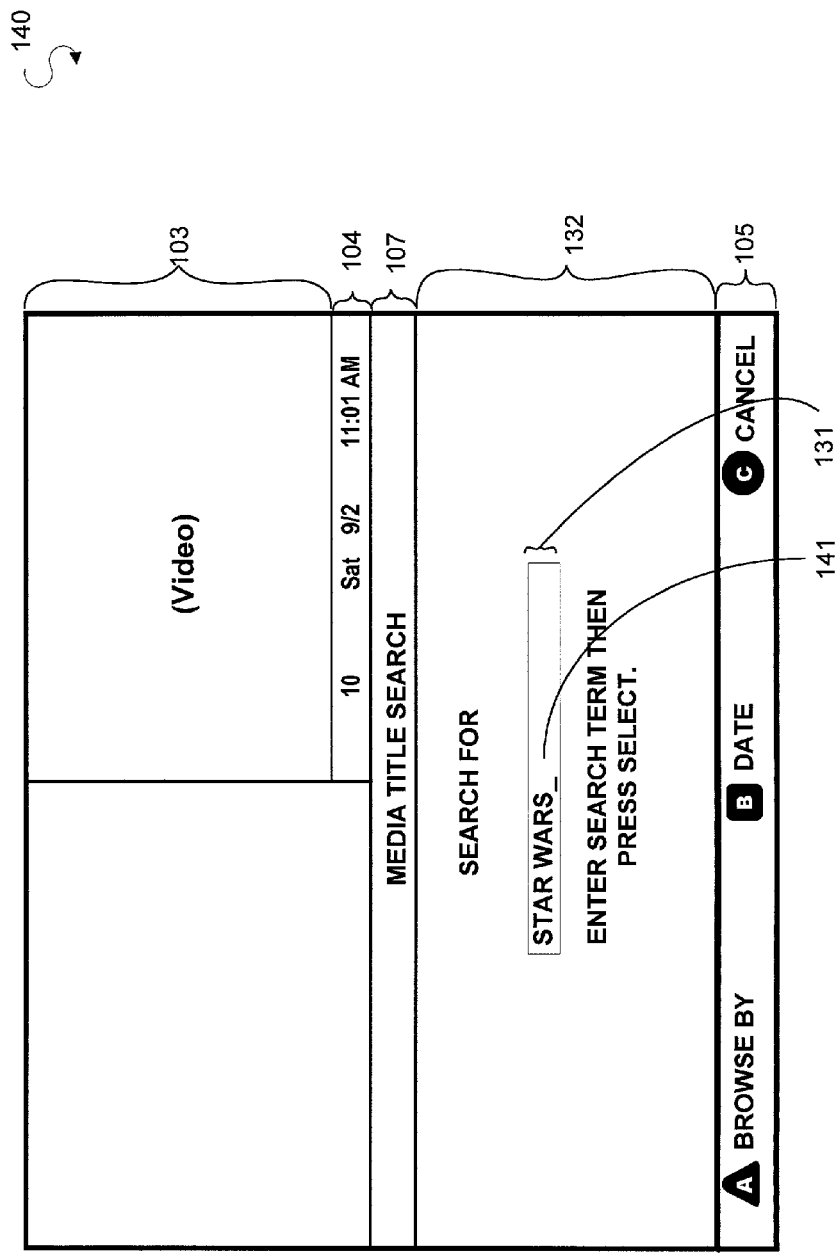
FIG. 8 depicts an example screen diagram of the guide arrangement in FIG. 7 after a search term is received by the DHCT as depicted in FIG. 2.

FIG. 8 depicts an example search screen 140 illustrating a guide arrangement in a search format that displays a search term 141 as received according to user input while example screen 130 is being presented to the user. It should be noted that search term 141 is just an example and that, in general, search terms may include any character sequence specified through user input. After the DHCT 16 receives input signaling that the entire search term 141 has been specified, i.e., the "SELECT" button is pressed on the remote control device 90, a text search of media titles in the IMG database 71 is performed by the IMG client application 72 and example screen 150 (FIG. 9) is presented to the user. In other embodiments, various types of data, including media titles, media descriptions, etc., are searched. Such embodiments may also include additional user interface mechanisms to enable a user to select which types of media data to search.

Figure 9:
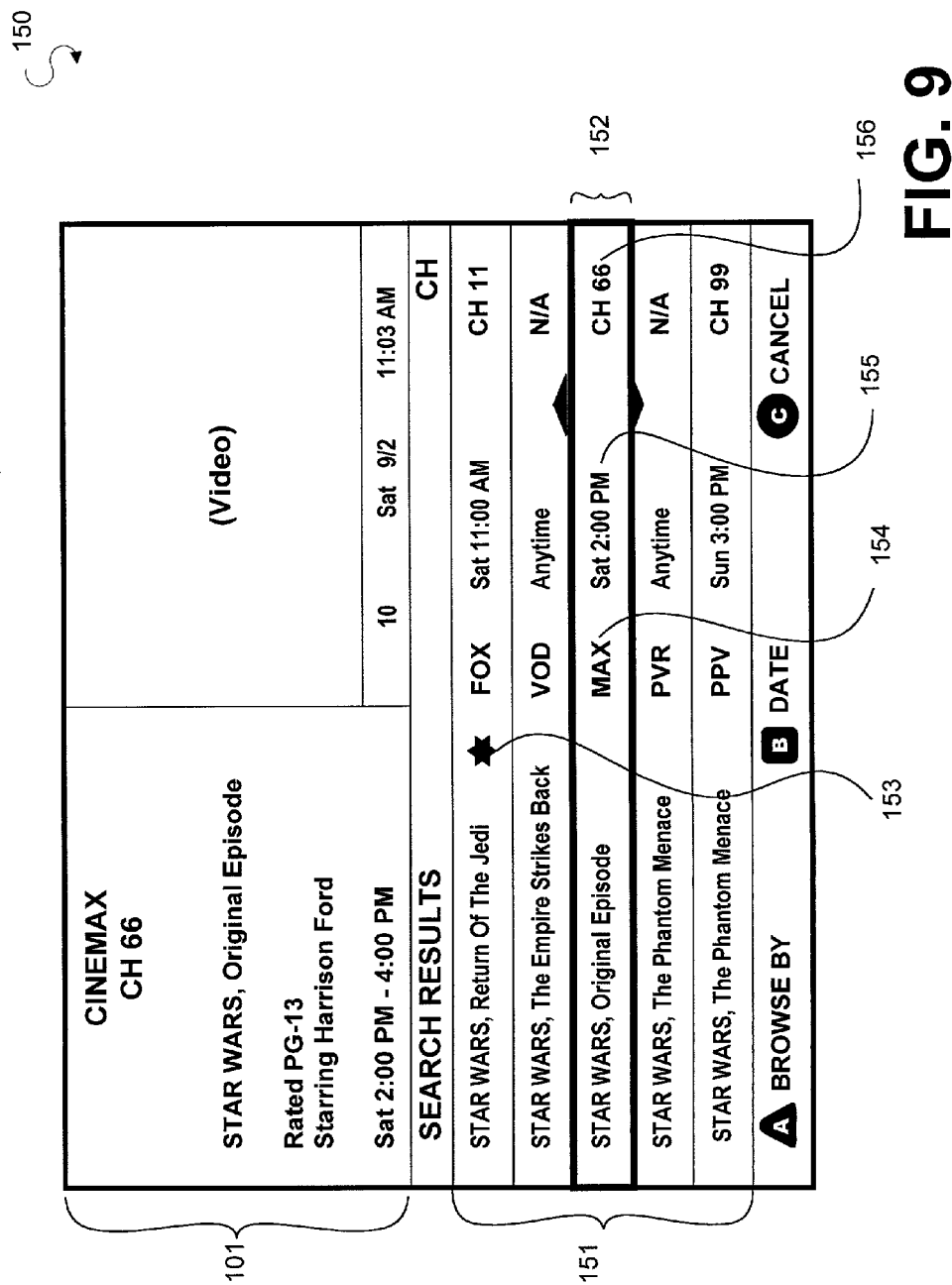
FIG. 9 depicts an example screen diagram that illustrates a guide arrangement showing search results that the DHCT as depicted in FIG. 2 presents the user.

FIG. 9 depicts an example search results screen 150 illustrating a guide arrangement in a search results view. The media information in the search results portion 151 includes media titles, media sources, starting times (if applicable), and channel numbers (if applicable). The media information corresponds to media titles that contain part of or all of the search term 141 (FIG. 8) and which are available for viewing during the pre-determined search period. A star icon 153 is included in the search results portion 151 to denote a media currently showing on one of the channels available to the user. The highlighted title area 152 is centered in the search results portion 151 enabling the user to scroll up and down to the various media presentations listed in the search results portion 151. Detailed media information is displayed for the media title shown in the highlighted title area 152, in the detailed focus area 101 of example screen 150.

Figure 10:
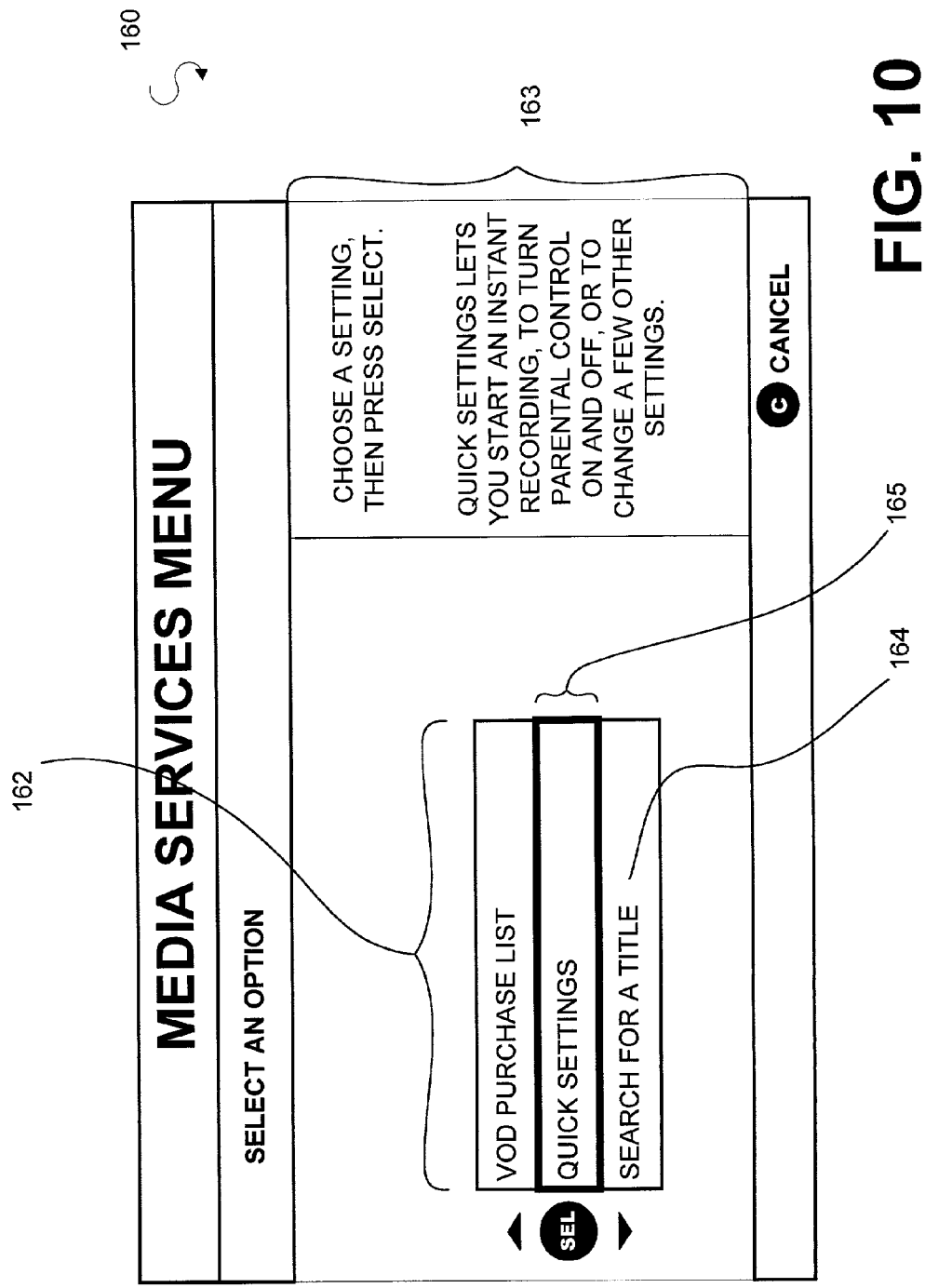
FIG. 10 depicts an example screen diagram that illustrates a method for a user to access the screen illustrated in FIG. 7.

FIG. 10 depicts an example menu screen 160 that illustrates another method for a user to access search screen 130. Menu screen 160 is presented to the user after the user activates the menu button 91 on the remote control device 90. The user may then have access to search screen 130 by selecting the "search for a title" option 164 via the remote control device 90. An option information section 163 contains information about the menu option displayed in the highlighted option area 165. In an alternative embodiment, the user is presented with a search screen after the user activates a search button 97 on the remote control device 90. The invention is not limited with respect to how a user requests a search or identifies a search term.

In one embodiment the search system described herein comprises capabilities for filtering-out and filtering-in attributes or fields of on-demand titles whereby search operations effect a search result compliant to one or more set filters activated by a user. For example, a user may choose to filter out R rated movies and may set a filtering operation offered by the DHCT for doing so. In such a case, when a user runs a search operation, only movies or television programs that are not rated R are presented to the user.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, the following is claimed:

The invention claimed is:

1. A method for enabling a user to search for media programs, the method comprising:
enabling a user to record a first set of media programs in a first storage device associated with a digital personal video recorder (PVR);
storing media information corresponding to the recorded first set of media programs in the first storage device, the media information including information related to at least a title and media type for each media program;
receiving media information corresponding to a second set of media programs that are currently being broadcast;
receiving media information corresponding to a third set of media programs that are to be broadcast in the future;
storing the media information corresponding to the second and third sets of media programs in a second storage device;
providing to the user a search option to search for media programs;
responsive to the user activating the search option, enabling the user to enter a search term;
responsive to the user entering a search term, searching the first and second storage devices for media information having a high level of correlation with the search term; and providing a list of media programs corresponding to the media information having a high level of correlation with the search term.

2. The method of claim 1, wherein, responsive to the user activating the search option, further enabling the user to enter a search criterion based on a range of start times of the media programs, and wherein searching the first and second storage devices further comprises searching for media information corresponding to media programs having a start time within the range of start times.

3. The method of claim 2, wherein enabling the user to enter a search criterion based on a range of start times comprises enabling the user to select a time period from a plurality of time periods.

4. The method of claim 3, wherein the user-selected time period is selected from time periods specified by dates.

5. The method of claim 4, wherein the dates are a dates.

6. The method of claim 4, wherein the dates are relative dates.

7. The method of claim 6, wherein the relative dates correspond to at least one of "Today Only", "Today and Tomorrow", and "Next 7 Days".

8. The method of claim 1, further comprising:
when the media information in the second storage device includes information indicating that a particular media program is a purchasable program, providing, with the list of media programs, an indication that the particular media program is a purchasable program.

9. The method of claim 8, wherein the particular media program is a video-on-demand program.

10. The method of claim 8, wherein the particular media program is a pay-per-view program.

11. The method of claim 8, further comprising:
providing, with the list of media programs, an indication that the media programs stored in the first storage device are programs recorded by the digital PVR.

12. The method of claim, further comprising:
when the media information in the second storage device includes information indicating that a particular media program is available via a subscription service, providing, with the list of media programs, an indication that the particular media program is available via the subscription service.

13. The method of claim 1, wherein, responsive to the user activating the search option, further enabling the user to enter a search criterion based on video quality.

14. The method of claim 13, wherein the search criterion based on video quality includes a criterion based on whether or not the media program includes high-definition video signals.

15. The method of claim 1, wherein the PVR is a random-access PVR.

16. The method of claim 1, wherein the PVR is a digital PVR.

17. The method of claim 1, wherein the first storage device is a digital storage device.

18. The method of claim 1, wherein the first storage device is a non-volatile storage device.

19. The method of claim 1, wherein the first storage device is a random-access storage device.

20. The method of claim 1, wherein the first storage device is different than the second storage device.

21. An interactive media services system comprising:
memory for storing media information, the media information including information related to a title, start time, and media type for each of a plurality of media programs;
a software program stored in the memory, the software program comprising a plurality of executable functions;
a processor configured to execute the software program, wherein executing the software program includes:
enabling a user to record in the memory a first set of media programs associated with a personal video recorder (PVR);
storing media information corresponding to the first set of recorded media programs in the memory;
receiving media information corresponding to a second set of media programs that are currently being broadcast or are to be broadcast in the future;
storing the media information corresponding to the second set of media programs in the memory;
providing to the user a search option to search for media programs;
responsive to the user activating the search option, enabling the user to enter a search term;
responsive to the user entering a search term, searching the memory for media information, corresponding to the first set of media programs and the second set of media programs, having a high level of correlation with the search term; and
providing a list of media programs corresponding to the media information having a high level of correlation with the search term.

22. The interactive media services system of claim 21, wherein, responsive to the user activating the search option, further enabling the user to enter a search criterion based on a range of start times of the media programs, and wherein searching the memory further comprises searching for media information corresponding to media programs having a start time within the range of start times.

23. The interactive media services system of claim 22, wherein enabling the user to enter a search criterion based on a range of start times comprises enabling the user to select a time period from a plurality of time periods.

24. The interactive media services system of claim 23, wherein the user-selected time period is selected from time periods specified by dates.

25. The interactive media services system of claim 24, wherein the dates are absolute dates.

26. The interactive media services system of claim 24, wherein the dates are relative dates.

27. The interactive media services system of claim 26, wherein the relative dates correspond to at least one of "Today Only", "Today and Tomorrow", and "Next 7 Days".

28. The interactive media services system of claim 21, wherein, when the media information corresponding to the media programs that are currently being broadcast or are to be broadcast in the future includes information indicating that a particular media program is a purchasable program, executing the software program further comprises providing, with the list of media programs, an indication that the particular media program is a purchasable program.

29. The interactive media services system of claim 28, wherein the particular media program is a video-on-demand program.

30. The interactive media services system of claim 28, wherein the particular media program is a pay-per-view program.

31. The interactive media services system of claim 28, further comprising:
providing, with the list of media programs, an indication that the media programs stored in the storage device are programs recorded by the PVR.

32. The interactive media services system of claim 21, further comprising:
when the media information in memory includes information indicating that a particular media program is available via a subscription service, providing, with the list of media programs, an indication that the particular media program is available via the subscription service.

33. The interactive media services system of claim 21, wherein providing the list of media programs comprises providing the list on a television.

34. The interactive media services system of claim 21, wherein, responsive to the user activating the search option, further enabling the user to enter a search criterion based on video quality.

35. The interactive media services system of claim 34, wherein the search criterion based on video quality is a criterion based on whether or not the media program includes high-definition video signals.

36. A set-top terminal (STT) comprising:
a receiver configured to receive a plurality of media programs and a plurality of media information, each one of the plurality of media information corresponding to a respective one of the plurality of media programs;
a storage device in communication with a personal video recorder (PVR);
memory storing program code thereon;
a processor configured by the program code to:
record one of the plurality of media programs on the PVR;
store a first one of the plurality of media information on the storage device, the first one of the plurality of media information describing the recorded one of the plurality of media programs;
store a second one of the plurality of media information on the storage device, the second one of the plurality of media information describing media programs that are currently being broadcast or are to be broadcast in the future;
provide a search option to enable the user to enter a search term;
responsive to the search term, search the first and second ones of the plurality of media information to find media information having a high level of correlation with the search term; and
provide a list of media programs which correspond to the media information having a high level of correlation with the search term.

37. The STT of claim 36, wherein the PVR is embodied within the STT.

38. The STT of claim 36, wherein the PVR is external to the STT.

39. The STT of claim 36, wherein, responsive to the user activating the search option, the processor is further configured to enable the user to enter a search criterion based on a range of start times of the media programs, and to search for media information corresponding to media programs having a start time within the range of start times.

40. The STT of claim 39, wherein the processor enabling the user to enter a search criterion based on a range of start times comprises enabling the user to select a time period from a plurality of time periods.

41. The STT of claim 40, wherein the user-selected time period is selected from time periods specified by dates.

42. The STT of claim 41, wherein the dates are absolute dates.

43. The STT of claim 41, wherein the dates are relative dates.

44. The STT of claim 41, wherein the dates are relative dates correspond to at least one of "Today Only", "Today and Tomorrow", and "Next 7 Days".

45. The STT of claim 36, wherein, when the media information corresponding to the second set of media programs includes information indicating that a particular media program is a purchasable program, the processor is configured to provide, with the list of media programs, an indication that the particular media program is a purchasable program.

46. The STT of claim 45, wherein the purchasable program is a video-on-demand program.

47. The STT of claim 45, wherein the purchasable program is a pay-per-view program.

48. The STT of claim 45, wherein the processor is further configured to provide, with the list of media programs, an indication that the media programs corresponding to the first set of media programs are programs recorded by the PVR.

49. The STT of claim 36, wherein, when the media information in the second storage device includes information indicating that a particular media program is available via a subscription service, the processor is further configured to provide, with the list of media programs, an indication that the particular media program is available via the subscription service.

50. The STT of claim 36, wherein the processor is configured to display the list of media programs on a television.

51. The STT of claim 36, wherein, responsive to the user activating the search option, the processor is further configured to enable the user to enter a search criterion based on video quality.

52. The STT of claim 51, wherein the search criterion based on video quality is a criterion based on whether or not the media program includes high-definition video signals.

* * * * *